United States Patent
Surjaatmadja et al.

(10) Patent No.: US 11,002,120 B1
(45) Date of Patent: May 11, 2021

(54) DYNAMIC PACKING SEAL COMPRESSION SYSTEM FOR PUMPS

(71) Applicant: Halliburton Energy Services, Inc., Houston, TX (US)

(72) Inventors: Jim Basuki Surjaatmadja, Duncan, OK (US); Robert Lee Pipkin, Marlow, OK (US); Timothy Holiman Hunter, Duncan, OK (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 16/804,557

(22) Filed: Feb. 28, 2020

(51) Int. Cl.
| | |
|---|---|
| *F16J 15/18* | (2006.01) |
| *F16J 15/24* | (2006.01) |
| *E21B 43/12* | (2006.01) |
| *F04B 53/02* | (2006.01) |
| *F04B 7/02* | (2006.01) |

(52) U.S. Cl.
CPC ............ *E21B 43/121* (2013.01); *F04B 53/02* (2013.01); *F16J 15/186* (2013.01); *F16J 15/24* (2013.01); *F04B 7/0266* (2013.01); *F05B 2240/57* (2013.01)

(58) Field of Classification Search
CPC .... F16J 15/184–186; F16J 15/18; F16J 15/16; F16J 15/50; F16J 15/52; F16J 15/26; F16J 3/06; F16J 3/00; F04B 53/02; F04B 53/00; F04B 7/0266; F05B 2240/57; E21B 43/12; E21B 43/121; E21B 43/00
USPC ....................................................... 277/322
See application file for complete search history.

(56) References Cited

U.S. PATENT DOCUMENTS

| | | | |
|---|---|---|---|
| 1,662,725 A | 3/1928 | Toney, Jr. | |
| 2,673,519 A | 3/1954 | Halliburton | |
| 2,678,006 A | 5/1954 | Gray | |
| 3,005,412 A * | 10/1961 | Camp .................. | F04B 53/142 |
| | | | 417/568 |
| 3,229,640 A | 1/1966 | Williams | |
| 3,301,197 A | 1/1967 | Dodson et al. | |
| 3,380,247 A | 4/1968 | Colmerauer | |

(Continued)

FOREIGN PATENT DOCUMENTS

| | | |
|---|---|---|
| CH | 257522 A | 10/1948 |
| DE | 19808724 A1 | 9/1998 |

(Continued)

OTHER PUBLICATIONS

Surjaatmadja, Jim Basuki et al., Filing Receipt, Application and Drawings for U.S. Appl. No. 16/436,356, filed Jun. 10, 2019, titled "Multi-Material Frac Valve Poppet", 78 pages.

(Continued)

*Primary Examiner* — Nathan Cumar
(74) *Attorney, Agent, or Firm* — Conley Rose, P.C.; Rodney B. Carroll

(57) ABSTRACT

A packing system for a pump includes a packing stack comprising a packing, wherein the packing is cylindrical and compressible such that the packing can fill a void volume in a reciprocating element bore of the pump; one or more springs; and a terminal component configured for sealing a terminus of the reciprocating element bore, wherein the one or more springs are positioned between the terminal component and the packing to provide a force on the packing that maintains compression of the packing within the void volume.

15 Claims, 16 Drawing Sheets

(56) References Cited

U.S. PATENT DOCUMENTS

| | | | |
|---|---|---|---|
| 3,887,305 A * | 6/1975 | Ito | F04B 53/164 |
| | | | 417/439 |
| 4,037,891 A | 7/1977 | Walters | |
| 4,289,294 A | 9/1981 | McLean | |
| 4,407,510 A | 10/1983 | Cornelius et al. | |
| 4,478,561 A * | 10/1984 | Elliston | F15B 3/00 |
| | | | 417/400 |
| 4,807,890 A | 2/1989 | Gorman et al. | |
| 4,951,919 A | 8/1990 | Haglund et al. | |
| 5,056,758 A * | 10/1991 | Bramblet | F16K 41/046 |
| | | | 251/214 |
| 5,061,159 A | 10/1991 | Pryor | |
| 5,230,520 A | 7/1993 | Deitle et al. | |
| 5,577,737 A | 11/1996 | Lacy | |
| 8,360,751 B2 | 1/2013 | Duncan | |
| 8,590,614 B2 | 11/2013 | Surjaatmadja et al. | |
| 9,945,362 B2 * | 4/2018 | Skurdalsvold | F04B 39/122 |
| 2003/0173380 A1 | 9/2003 | Gerber et al. | |
| 2004/0207159 A1 | 10/2004 | Morrow et al. | |
| 2009/0246051 A1 | 10/2009 | Kim | |
| 2010/0242720 A1 * | 9/2010 | Matzner | F16C 5/00 |
| | | | 92/139 |
| 2012/0279721 A1 | 11/2012 | Surjaatmadja et al. | |
| 2014/0127036 A1 | 5/2014 | Buckley et al. | |
| 2014/0127058 A1 | 5/2014 | Buckley et al. | |
| 2014/0127062 A1 | 5/2014 | Buckley et al. | |
| 2014/0322050 A1 * | 10/2014 | Marette | F04B 47/02 |
| | | | 417/437 |
| 2016/0131131 A1 * | 5/2016 | Weaver | F04B 1/0408 |
| | | | 277/300 |
| 2016/0258264 A1 * | 9/2016 | Lesko | E21B 47/06 |
| 2016/0281699 A1 * | 9/2016 | Gnessin | F04F 1/00 |
| 2016/0319805 A1 | 11/2016 | Dille | |
| 2019/0145391 A1 | 5/2019 | Davids | |
| 2020/0347706 A1 | 11/2020 | Nowell et al. | |

FOREIGN PATENT DOCUMENTS

| | | | |
|---|---|---|---|
| EP | 0580196 A1 | 1/1994 | |
| EP | 1103722 A2 | 5/2001 | |
| EP | 2383470 A1 | 11/2011 | |
| GB | 120622 A | 11/1918 | |
| GB | 450645 A | 7/1936 | |
| GB | 672173 A | 5/1952 | |
| GB | 1226014 A | 3/1971 | |
| GB | 1262826 A | 2/1972 | |
| JP | 63001012 Y2 | 1/1988 | |
| JP | 2002037217 A | 2/2002 | |
| JP | 2004257283 A | 9/2004 | |
| JP | 4121804 B2 | 7/2008 | |
| JP | 2009131747 A | 6/2009 | |
| JP | 5107651 B2 | 12/2012 | |
| JP | 2020040010 A | 3/2020 | |

OTHER PUBLICATIONS

Brunet, John Dexter, Filing Receipt, Application and Drawings for U.S. Appl. No. 16/804,542, filed Feb. 28, 2020, titled "Frac Pump Plunger Centering Bearing to Avoid Premature Carrier, Packing, or Plunger Failure", 81 pages.

Foreign Communication from Related Application—International Search Report and Written Opinion of the International Searching Authority, International Application No. PCT/US2020/022043, dated Jul. 3, 2020, 13 pages.

Kiani, Mahdi et al., "Numerical Modeling and Analytical Investigation of Autofrettage Process on the Fluid End Module of Fracture Pumps," Journal of Pressure Vessel Technology, Aug. 2018, pp. 0414031-0414037, vol. 140, ASME.

"Pump Catalog," Cat Pumps, Inc., 2014, 24 pages.

Furuta, Katsunori et al., "Study of the In-Line Pump System for Diesel Engines to Meet Future Emission Regulations," SAE International Congress and Exposition, Feb. 1998, pp. 125-136, Society of Automotive Engineers, Inc.

"550 Series: High Pressure, High Flow Water Jetting," Gardner Denver Water Jetting Systems, Inc., 2009, 4 pages.

Houghton, J.E. et al., "Improved Pump Run Time Using Snow Auto-Rotating Plunger (SARP) Pump," SPE Western Regional Meeting, May 1998, SPE46217, 6 pages, Society of Petroleum Engineers, Inc.

"Improved Double Acting Pump, Scientific American," 1867, pp. 248, vol. 17, No. 16, American Periodicals.

Langewis, Jr., C. et al., "Practical Hydraulics of Positive Displacement Pumps for High-Pressure Waterflood Installations," Journal of Petroleum Technology, Feb. 1971, pp. 173-179, SPE-AIME/Continental Oil Co.

Petzold, Martin et al., "Visualization and Analysis of the Multiphase Flow in an Electromagnetically Driven Dosing Pump," ASME/BATH Symposium on Fluid Power & Motion Control, Oct. 2013, FPMC2013-4433, 6 pages, ASME.

Romer, M. C. et al., "Field Trial of a Novel Self-Reciprocating Hydraulic Pump for Deliquification," SPE Production & Operations, 2017, 12 pages, Society of Petroleum Engineers.

\* cited by examiner

US 11,002,120 B1

DYNAMIC PACKING SEAL COMPRESSION SYSTEM FOR PUMPS

CROSS-REFERENCE TO RELATED APPLICATIONS

Not applicable.

STATEMENT REGARDING FEDERALLY SPONSORED RESEARCH OR DEVELOPMENT

Not applicable.

TECHNICAL FIELD

The present disclosure relates generally to a method and apparatus for supplying pressurized fluids. More particularly, the present disclosure relates to methods and reciprocating devices for pumping fluids into a wellbore.

BACKGROUND

High-pressure pumps having reciprocating elements such as plungers or pistons are commonly employed in oil and gas production fields for operations such as drilling and well servicing. For instance, one or more reciprocating pumps may be employed to pump fluids into a wellbore in conjunction with activities including fracturing, acidizing, remediation, cementing, and other stimulation or servicing activities. Due to the harsh conditions associated with such activities, many considerations are generally taken into account when designing a pump for use in oil and gas operations. One design consideration may concern lifetime and reliability of pump fluid end components, as reciprocating pumps used in wellbore operations, for example, often encounter high cyclical pressures and various other conditions that can render pump components susceptible to wear and result in a need for servicing and maintenance of the pump.

Accordingly, it is desirable to provide a pump fluid end that enhances a life of components therein, such as a reciprocating element and a packing stack and components thereof, whereby maintenance can be minimized and/or simplified.

BRIEF SUMMARY OF THE DRAWINGS

For a more complete understanding of this disclosure, reference is now made to the following brief description, taken in connection with the accompanying drawings and detailed description, wherein like reference numerals represent like parts.

DETAILED DESCRIPTION

It should be understood at the outset that although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

Disclosed herein is a reciprocating apparatus for pumping pressurized fluid. In embodiments, the reciprocating apparatus comprises a pump fluid end containing a packing system. The packing system of this disclosure comprises: a packing stack comprising a packing; one or more springs, and a terminal component configured for sealing a terminus of the reciprocating element bore. The packing is cylindrical and compressible such that the packing can fill a void volume in a reciprocating element bore of the pump. As detailed hereinbelow, the one or more springs can be positioned between the terminal component and the packing (or elsewhere within or adjacent the packing stack) to provide a force on the packing that maintains compression of the packing within the void volume. In embodiments, the reciprocating apparatus is a high-pressure pump configured to operate at a pressure greater than or equal to about 3,000 psi and/or in a well servicing operation and environment. As detailed further hereinbelow, utilization of a packing system of this disclosure can increase a life of a reciprocating element and/or of the packing stack relative to a conventional packing system, thus potentially enabling a reduction in maintenance cost and downtime for maintenance of the pump.

Figure 1:
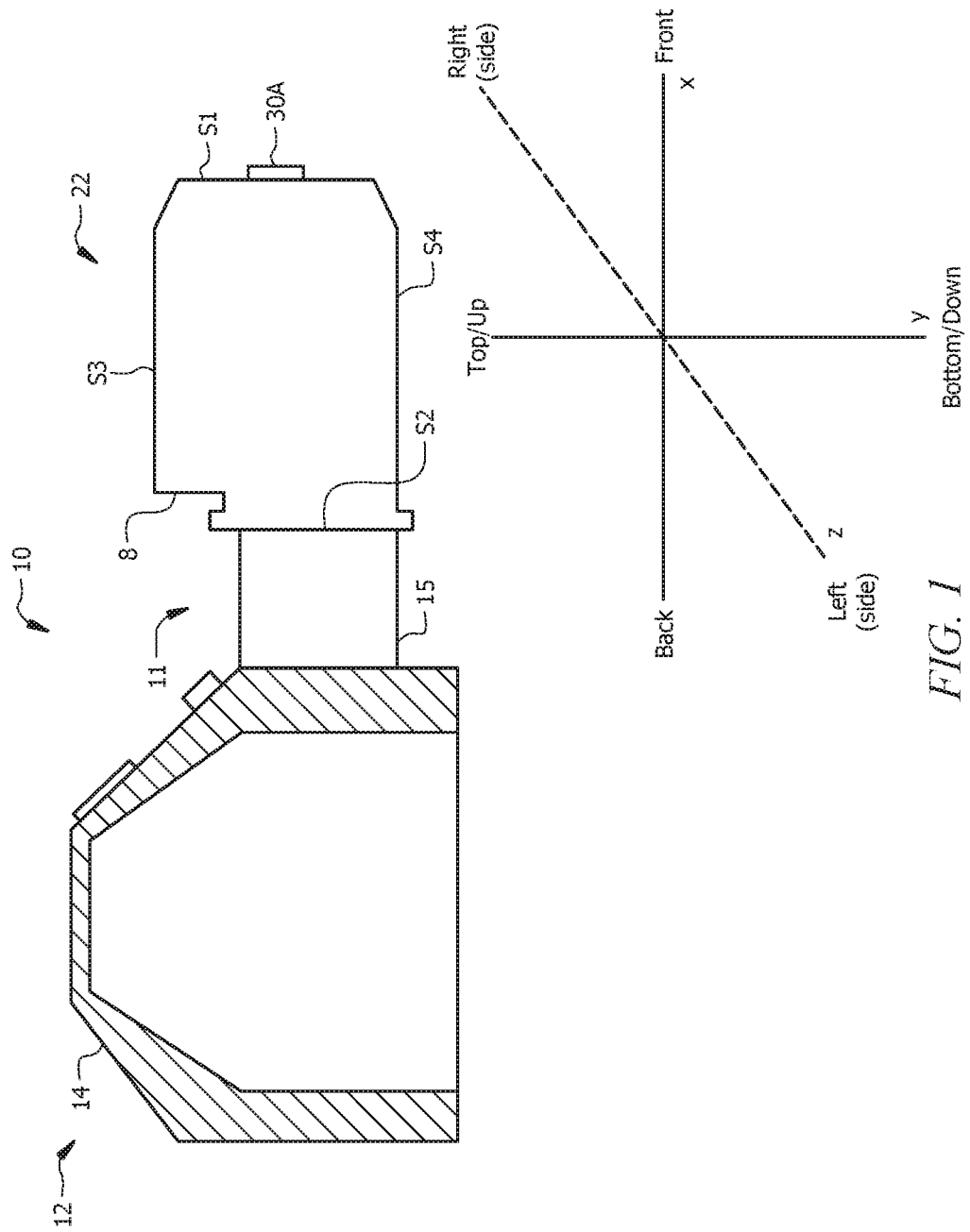
FIG. 1 is an elevational view of a reciprocating pump, according to embodiments of this disclosure.

A reciprocating apparatus of this disclosure may comprise any suitable pump operable to pump fluid. Non-limiting examples of suitable pumps include, but are not limited to, piston pumps, plunger pumps, and the like. In embodiments, the pump is a rotary- or reciprocating-type pump such as a positive displacement pump operable to displace pressurized fluid. The pump comprises a pump power end, a pump fluid end, and an integration section whereby a reciprocating element (e.g., a plunger) can be mechanically connected with the pump power end such that the reciprocating element can be reciprocated within a reciprocating element bore of the pump fluid end. FIG. 1 is an elevational view (e.g., side view) of a pump 10 (e.g., a reciprocating pump) according to an exemplary embodiment, the reciprocating pump comprising a pump power end 12, a pump fluid end 22, and an integration section 11. As illustrated in FIG. 1, pump fluid end has a front S1 opposite a back S2 along a first or x-axis, a top S3 opposite a bottom S4 along a second or y-axis, wherein the y-axis is in the same plane as and perpendicular to the x-axis, and a left side and a right side along a z-axis, wherein the z-axis is along a plane perpendicular to the plane of the x-axis and the y-axis. Accordingly, toward the top of pump fluid end 22 (and pump 10) is along the y-axis toward top S3, toward the bottom of pump fluid end 22 (and pump 10) is along the y-axis toward bottom S4, toward the front of pump fluid end 22 (and pump 10) is along the x-axis toward front S1, and toward the back of pump fluid end 22 (and pump 10) is along the x-axis away from front S1.

Figure 2A:
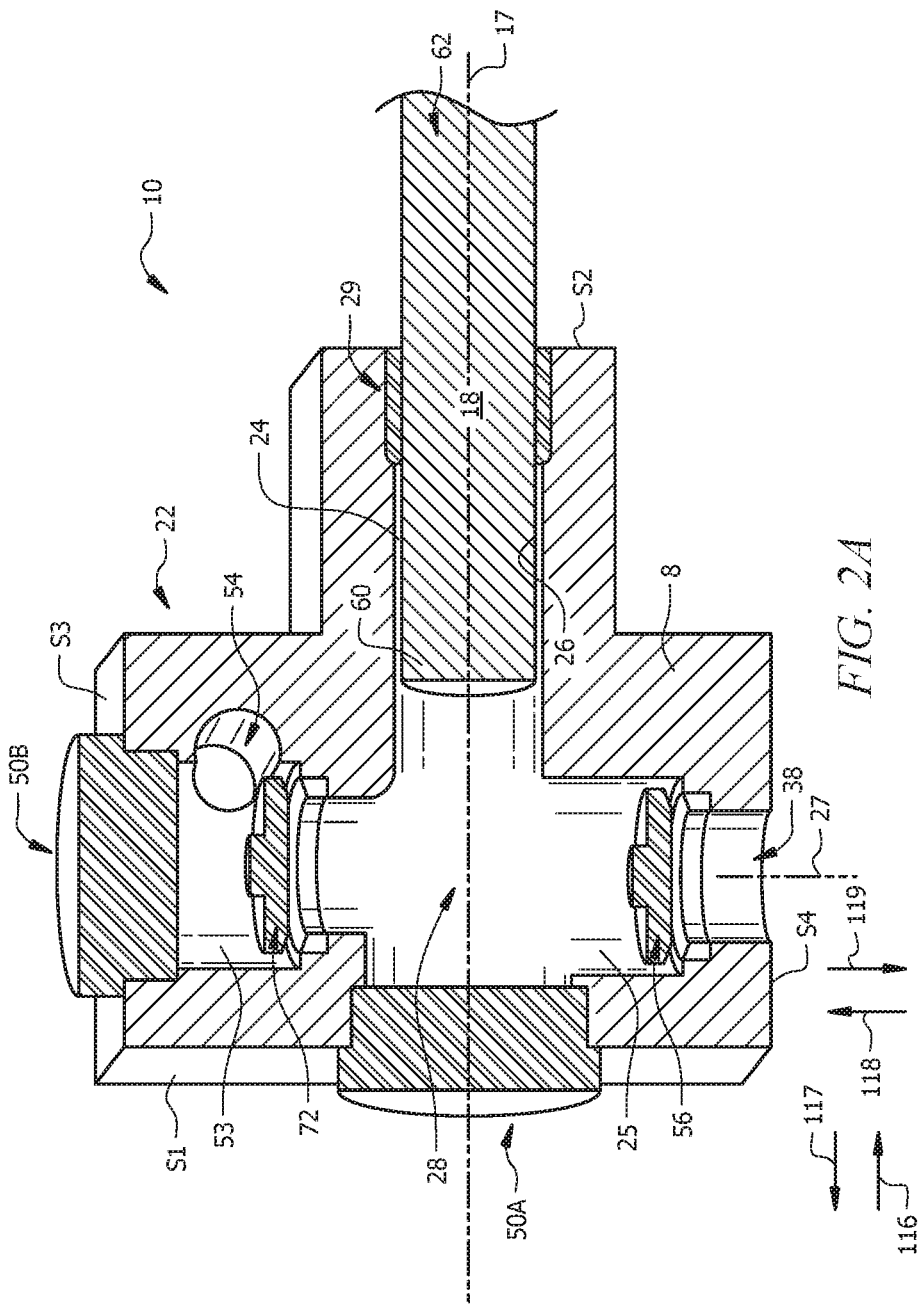
FIG. 2A is a cut-away illustration of an exemplary reciprocating pump comprising a cross-bore pump fluid end, according to embodiments of the present disclosure.
Figure 2B:
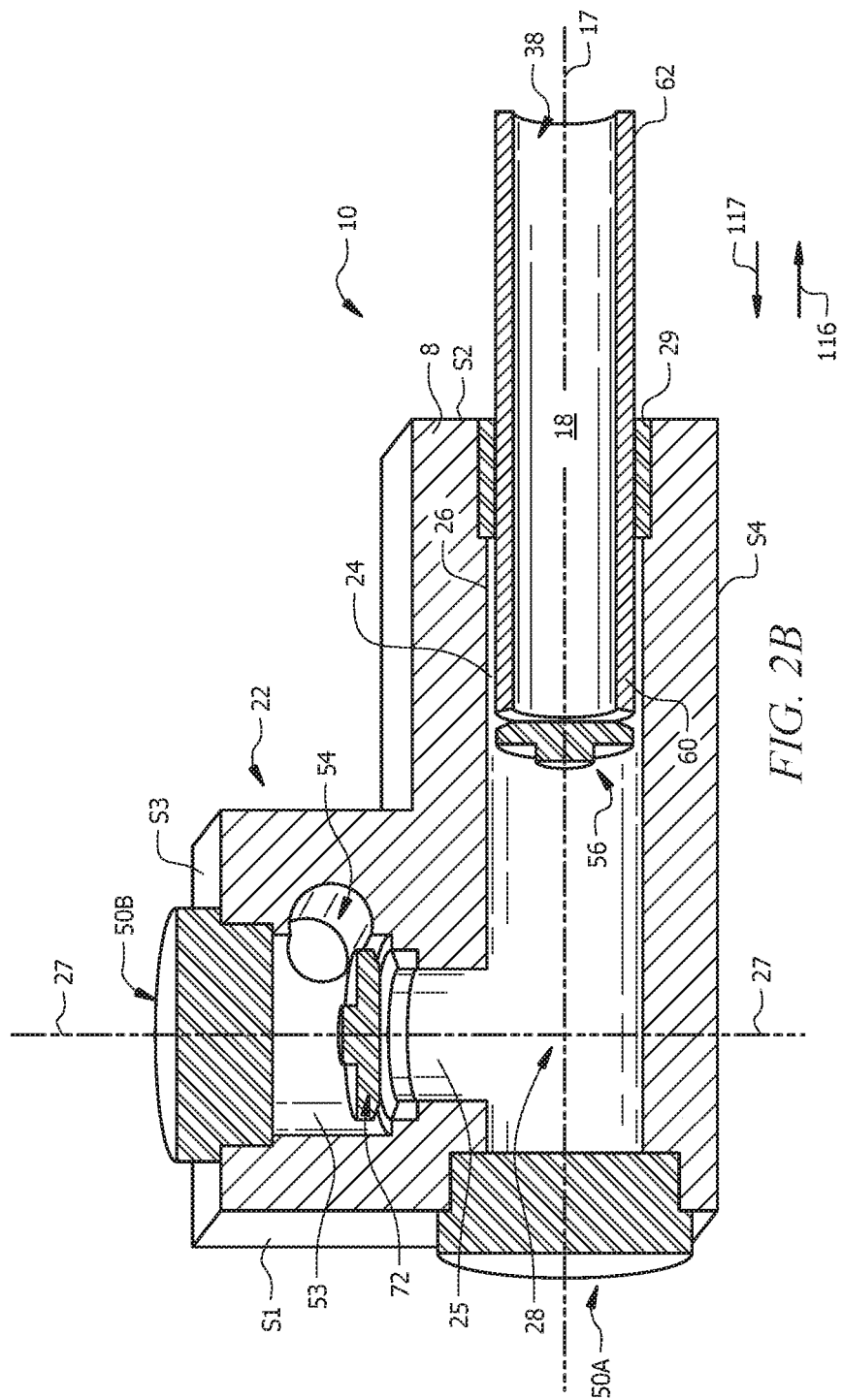
FIG. 2B is a cut-away illustration of an exemplary reciprocating pump comprising a cross-bore pump fluid end, according to other embodiments of the present disclosure.
Figure 3:
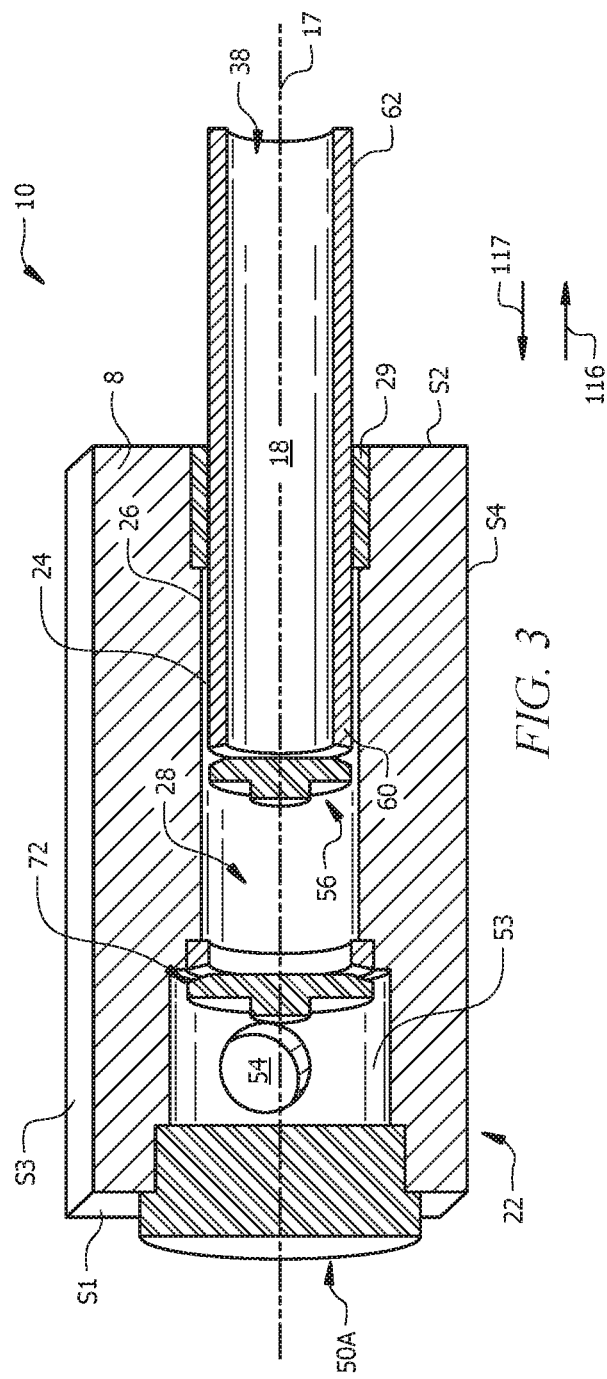
FIG. 3 is a cut-away illustration of an exemplary reciprocating pump comprising a concentric bore pump fluid end, according to embodiments of the present disclosure.

The pump fluid end 22 is integrated with the pump power end 12 via the integration section 11, such that pump power end 12 is operable to reciprocate the reciprocating element 18 within a reciprocating element bore 24 (FIGS. 2-3) of the pump fluid end 22. The reciprocating element bore 24 is at least partially defined by a cylinder wall 26. As described further hereinbelow with reference to FIGS. 2A-2B and FIG. 3, pump fluid end 22 can be a multi-bore pump fluid end (also referred to herein as a cross-bore pump fluid end) 22 or, alternatively, an in-line or "concentric" bore pump fluid end. As utilized herein, multi-bore pump fluid ends can comprise "T-bore" pump fluid ends, "X-bore" (e.g., cross shaped bore) pump fluid ends, or "Y-bore" pump fluid ends. FIG. 2A is a schematic showing a cross-bore pump fluid end 22 engaged with a reciprocating element 18, wherein the cross-bore pump fluid end 22 comprises a cross-bore 25 that makes a cross shape (+) relative to reciprocating element bore 24. FIG. 2B is a schematic showing a cross-bore pump fluid end 22 engaged with a reciprocating element 18, wherein the cross bore pump fluid end 22 comprises a tee-bore 25 that makes a "T" shape relative to reciprocating element bore 24. FIG. 3 is a schematic showing a concentric bore pump fluid end 22 engaged with a reciprocating element 18. As discussed further below, the pump 10 includes at least one fluid inlet 38 for receiving fluid from a fluid source, e.g., a suction line, suction header, storage or mix tank, blender, discharge from a boost pump such as a centrifugal pump, etc. The pump 10 also includes at least one discharge outlet 54 for discharging fluid to a discharge source, e.g., a flowmeter, pressure monitoring and control system, distribution header, discharge line, wellhead, discharge manifold pipe, and the like.

The pump 10 may comprise any suitable pump power end 12 for enabling the pump 10 to perform pumping operations (e.g., pumping a wellbore servicing fluid downhole). Similarly, the pump 10 may include any suitable housing 14 for containing and/or supporting the pump power end 12 and components thereof. The housing 14 may comprise various combinations of inlets, outlets, channels, and the like for circulating and/or transferring fluid. Additionally, the housing 14 may include connections to other components and/or systems, such as, but not limited to, pipes, tanks, drive mechanisms, etc. Furthermore, the housing 14 may be configured with cover plates or entryways for permitting access to the pump power end 12 and/or other pump components. As such, the pump 10 may be inspected to determine whether parts need to be repaired or replaced. The pump power end may also be hydraulically driven, whether it is a non-intensifying or an intensifying system.

Figure 4:
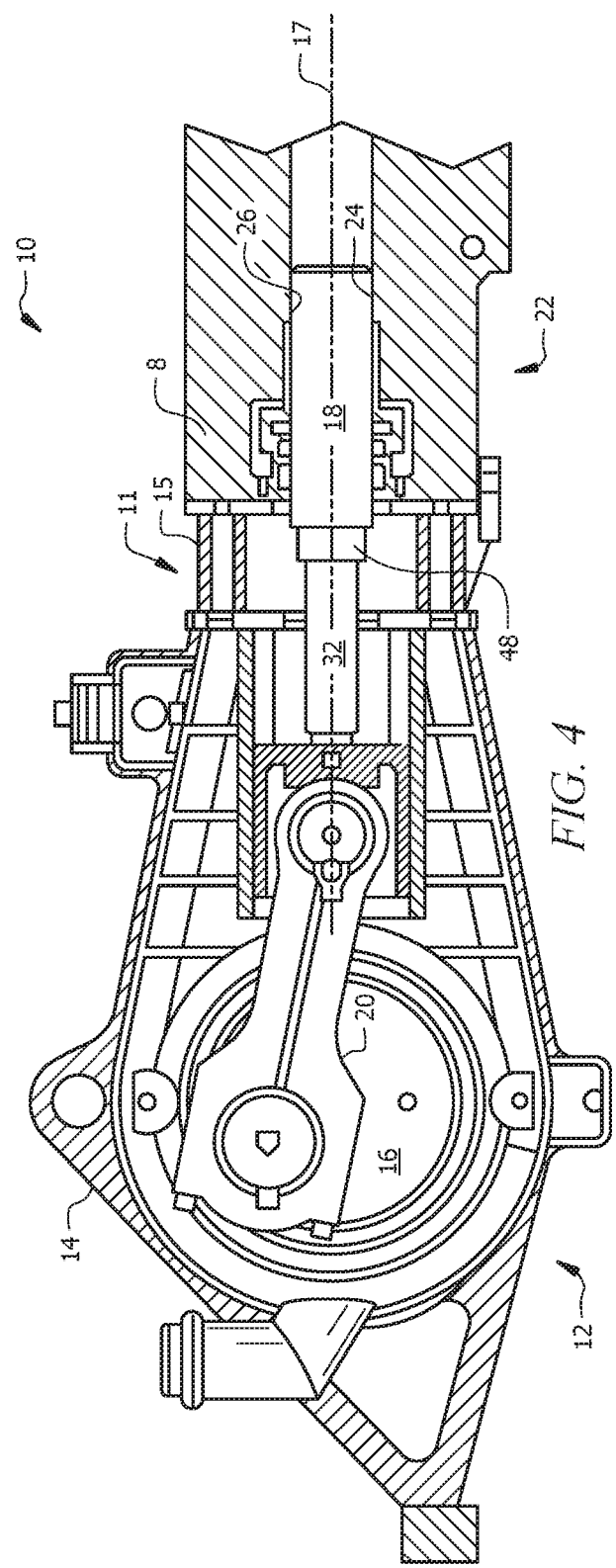
FIG. 4 is cut-away illustration of a pump power end of a pump, according to embodiments of the present disclosure.

Those versed in the art will understand that the pump power end 12 may include various components commonly employed in pumps. Pump power end 12 can be any suitable pump known in the art and with the help of this disclosure to be operable to reciprocate reciprocating element 18 in reciprocating element bore 24. For example, without limitation, pump power end 12 can be operable via and comprise a crank and slider mechanism, a powered hydraulic/pneumatic/steam cylinder mechanism or various electric, mechanical or electro-mechanical drives. FIG. 4 provides a cutaway illustration of an exemplary pump 10 of this disclosure, showing an exemplary pump power end 12, integrated via integration section 11 with a pump fluid end 22, wherein the pump power end 12 is operable to reciprocate the reciprocating element 18 within a reciprocating element bore 24 of the pump fluid end 22. Briefly, for example, the pump power end 12 may include a rotatable crankshaft 16 attached to at least one reciprocating element 18 (e.g., a plunger or piston) by way of a crank arm/connecting rod 20. Additionally, an engine (e.g., a diesel engine), motor, or other suitable power source may be operatively connected to the crankshaft 16 (e.g., through a transmission and drive shaft) and operable to actuate rotation thereof. In operation, rotation of the crankshaft 16 induces translational movement of the crank arm/connecting rod 20, thereby causing the reciprocating element 18 to extend and retract along a flow path, which may generally be defined by a central axis 17 within a reciprocating element bore 24 (sometimes referred to herein for brevity as a "reciprocating element bore 24" or simply a "bore 24", and not wishing to be limited to a particular reciprocating element 18). Pump 10 of FIG. 1 is typically mounted on a movable structure such as a semi-tractor trailer or skid, and the moveable structure may contain additional components, such as a motor or engine (e.g., a diesel engine), that provides power (e.g., mechanical motion) to the pump power end 12 (e.g., a crankcase comprising crankshaft 16 and related connecting rods 20).

Of course, numerous other components associated with the pump power end 12 of the pump 10 may be similarly employed, and therefore, fall within the purview of the present disclosure. Furthermore, since the construction and operation of components associated with pumps of the sort depicted in FIG. 1 are well known and understood, discussion of the pump 10 will herein be limited to the extent necessary for enabling a proper understanding of the disclosed embodiments.

As noted hereinabove, the pump 10 comprises a pump fluid end 22 attached to the pump power end 12. Various embodiments of the pump fluid end 22 are described in detail below in connection with other drawings, for example FIGS. 2A-2B and FIG. 3. Generally, the pump fluid end 22 comprises at least one fluid inlet 38 for receiving fluid, and at least one discharge outlet 54 through which fluid flows out of the discharge chamber 53. The pump fluid end 22 also comprises at least one valve assembly for controlling the receipt and output of fluid. For example, the pump fluid end 22 can comprise a suction valve assembly 56 and a discharge valve assembly 72. The pump fluid end 22 may include any suitable component(s) and/or structure(s) for containing and/or supporting the reciprocating element 18 and providing a cylinder wall 26 at least partially defining a reciprocating element bore 24 along which the pump power end can reciprocate the reciprocating element during operation of the pump.

In embodiments, the pump fluid end 22 may comprise a cylinder wall 26 at least partially defining a bore 24 through which the reciprocating element 18 may extend and retract. Additionally, the bore 24 may be in fluid communication with a discharge chamber 53 formed within the pump fluid end 22. Such a discharge chamber 53, for example, may be configured as a pressurized discharge chamber 53 having a discharge outlet 54 through which fluid is discharged by the reciprocating element 18. Thus, the reciprocating element 18 may be movably disposed within the reciprocating element bore 24, which may provide a fluid flow path into and/or out of the pump chamber. During operation of the pump 10, the reciprocating element 18 may be configured to reciprocate along a path (e.g., along central axis 17 within bore 24 and/or pump chamber 28, which corresponds to reciprocal movement parallel to the x-axis of FIG. 1) to transfer a supply of fluid to the pump chamber 28 and/or discharge fluid from the pump chamber 28.

In operation, the reciprocating element 18 extends and retracts along a flow path to alternate between providing forward strokes (also referred to as discharge strokes and correlating to movement in a positive direction parallel to the x-axis of FIG. 1, indicated by arrow 117) and return strokes (also referred to as suction strokes and correlating to movement in a negative direction parallel to the x-axis of FIG. 1, indicated by arrow 116), respectively. During a forward stroke, the reciprocating element 18 extends away from the pump power end 12 and toward the pump fluid end 22. Before the forward stoke begins, the reciprocating element 18 is in a fully retracted position (also referred to as bottom dead center (BDC) with reference to the crankshaft 16), in which case the suction valve assembly 56 can be in a closed configuration having allowed fluid to flow into the (e.g., high pressure) pump chamber 28. (As utilized here, "high pressure" indicates possible subjection to high pressure during discharge.) When discharge valve assembly 72 is in a closed configuration (e.g., under the influence of a closing mechanism, such as a spring), the high pressure in a discharge pipe or manifold containing discharge outlet 54 prevents fluid flow into discharge chamber 53 and causes pressure in the pump chamber 28 to accumulate upon stroking of the reciprocating element 18. When the reciprocating element 18 begins the forward stroke, the pressure builds inside the pump chamber 28 and acts as an opening force that results in positioning of the discharge valve assembly 72 in an open configuration, while a closing force (e.g., via a closing mechanism, such as a spring and/or pressure increase inside pump chamber 28) urges the suction valve assembly 56 into a closed configuration. When utilized in connection with a valve assembly, 'open' and 'closed' refer, respectively, to a configuration in which fluid can flow through the valve assembly (e.g., can pass between a valve body (e.g., a movable poppet) and a carrier or a valve seat thereof) and a configuration in which fluid cannot flow through the valve assembly (e.g., cannot pass between a valve body (e.g., a movable poppet) and a carrier or a valve seat thereof). As the reciprocating element 18 extends forward, fluid within the pump chamber 28 is discharged through the discharge outlet 54.

During a return stroke, the reciprocating element 18 reciprocates or retracts away from the pump fluid end 22 and towards the pump power end 12 of the pump 10. Before the return stroke begins, the reciprocating element 18 is in a fully extended position (also referred to as top dead center (TDC) with reference to the crankshaft 16), in which case the discharge valve assembly 72 can be in a closed configuration having allowed fluid to flow out of the pump chamber 28 and the suction valve assembly 56 is in a closed configuration. When the reciprocating element 18 begins and retracts towards the pump power end 12, the discharge valve assembly 72 assumes a closed configuration, while the suction valve assembly 56 opens. As the reciprocating element 18 moves away from the discharge valve 72 during a return stroke, fluid flows through the suction valve assembly 56 and into the pump chamber 28.

With reference to the embodiments of FIG. 2A, which is a schematic showing a cross-bore pump fluid end 22 engaged with a reciprocating element 18, cross-bore pump fluid end 22 comprises a cross-bore fluid end body 8, a cross-bore pump chamber 28, a suction valve assembly 56, and a discharge valve assembly 72. In this cross-bore configuration, suction valve assembly 56 and discharge valve assembly 72 are located in a bore or channel 25 (also referred to herein as a cross bore 25) of pump chamber 28, wherein bore 25 has a central axis 27 that is parallel to the y-axis of FIG. 1 and is perpendicular to bore 24 in which reciprocating element 18 reciprocates during operation. Suction valve assembly 56 and discharge valve assembly 72 are operable to direct fluid flow within the pump 10. When reciprocating element 18 retracts, or moves along central axis 17 in a direction away from the pump chamber 28 and the pump fluid end 22 and toward the pump power end 12 (as indicated by arrow 116), a suction valve of the suction valve assembly 56 opens (e.g., either under natural flow or other biasing means), and a discharge valve of discharge valve assembly 72 will be closed, whereby fluid enters pump chamber 28 via fluid inlet 38. When the reciprocating element 18 reverses direction, due to the action of the pump power end 12, the reciprocating element 18 reverses direction along central axis 17, now moving in a direction toward the pump chamber 28 and pump fluid end 22 and away from pump power end 12 (as indicated by arrow 117), and the discharge valve of discharge valve assembly 72 is open and the suction valve of suction valve assembly 56 is closed (e.g., again either due to fluid flow and/or other biasing means of valve control), such that fluid is pumped out of pump chamber 28 via discharge outlet 54.

With reference to the embodiment of FIG. 2B, which is a schematic showing a T-bore pump fluid end 22 engaged with a reciprocating element 18, T-bore pump fluid end 22 comprises a T-bore fluid end body 8, a T-shaped pump chamber 28, a suction valve assembly 56, and a discharge valve assembly 72. In this T-bore configuration of FIG. 2B, suction valve assembly 56 is coupled with front end 60 of reciprocating element 18 and discharge valve assembly 72 is positioned in bore 25 that makes a tee with reciprocating element bore 24, i.e., central axis 17 of reciprocating element bore 24 is also the central axis of suction pump assembly 56 and perpendicular to a central axis 27 of discharge valve assembly 72 (i.e., central axis 27 is parallel to the y-axis of FIG. 1 and is perpendicular to bore 24 in which reciprocating element 18 reciprocates during operation). Suction valve assembly 56 and discharge valve assembly 72 are operable to direct fluid flow within the pump 10. When reciprocating element 18 retracts, or moves along central axis 17 in a direction away from the pump chamber 28 and the pump fluid end 22 and toward the pump power end 12 (as indicated by arrow 116), a suction valve of the suction valve assembly 56 opens (e.g., either under natural flow or other biasing means), and a discharge valve of discharge valve assembly 72 will be closed, whereby fluid enters pump chamber 28 via fluid inlet 38. When the reciprocating element 18 reverses direction, due to the action of the pump power end 12, the reciprocating element 18 reverses direction along central axis 17, now moving in a direction toward the pump chamber 28 and pump fluid end 22 and away from pump power end 12 (as indicated by arrow 117), and the discharge valve of discharge valve assembly 72 is open and the suction valve of suction valve assembly 56 is closed (e.g., again either due to fluid flow and/or other biasing means of valve control), such that fluid is pumped out of pump chamber 28 via discharge outlet 54.

With reference to the embodiment of FIG. 3, which is a schematic showing a concentric pump fluid end 22 engaged with a reciprocating element 18, concentric bore pump fluid end 22 comprises a concentric bore fluid end body 8, a concentric pump chamber 28, a suction valve assembly 56, and a discharge valve assembly 72. In this concentric bore configuration, suction valve assembly 56 and discharge valve assembly 72 are positioned in-line (also referred to as coaxial) with reciprocating element bore 24, i.e., central axis 17 of reciprocating element bore 24 is also the central axis of suction pump assembly 56 and discharge valve assembly 72). Suction valve assembly 56 and discharge valve assembly 72 are operable to direct fluid flow within the pump 10. In some concentric bore fluid end designs, fluid flows within a hollow reciprocating element (e.g., a hollow plunger) 18. In some such embodiments, the reciprocating element bore 24 of such a concentric bore fluid end design can be defined by a high pressure cylinder 26 providing a high pressure chamber and a low pressure cylinder (not depicted in the embodiment of FIG. 3) providing a low pressure chamber toward tail end 62 of reciprocating element 18, whereby fluid from fluid inlet 38 enters reciprocating element 18. When reciprocating element 18 retracts, or moves along central axis 17 in a direction away from the pump chamber 28 and pump fluid end 22 and toward pump power end 12 (as indicated by arrow 116), a suction valve of the suction valve assembly 56 opens (e.g., either under natural flow and/or other biasing means), and a discharge valve of discharge valve assembly 72 will be closed, whereby fluid enters pump chamber 28 via a fluid inlet 38. For a concentric bore pump fluid end 22 design, the fluid inlet can be configured to introduce fluid into pump chamber 28 via a reciprocating element 18 that is hollow and/or via a low pressure chamber as described above. When the reciprocating element 18 reverses direction, due to the action of the pump power end 12, the reciprocating element 18 reverses direction along central axis 17, now moving in a direction toward the pump chamber 28 and pump fluid end 22 and away from pump power end 12 (as indicated by arrow 117), and the discharge valve of discharge valve assembly 72 is open and the suction valve of suction valve assembly 56 is closed (e.g., again either due to fluid flow and/or other biasing means of valve control), such that fluid is pumped out of pump chamber 28 via discharge chamber 53 and discharge outlet 54.

A pump 10 of this disclosure can comprise one or more access ports. For example, with reference to the cross-bore fluid end body 8 embodiments of FIG. 2A and FIG. 2B, a front access port 50A can be located on a front S1 of the pump fluid end 22 opposite a back S2 of the pump fluid end 22, wherein the back S2 of the pump fluid end is proximal the pump power end 12, upon integration therewith via integration section 11. A top access port 50B can be located on a top S3 of the pump fluid end 22 opposite a bottom S4 of the pump fluid end 22, wherein the top S1 of the pump fluid end 22 is above central axis 17 and the bottom S4 of the pump fluid end 22 is below central axis 17. With reference to the concentric fluid end body 8 embodiment of FIG. 3, a front access port 50A can be located on a front S1 of the pump fluid end 22 opposite a back S2 of the pump fluid end 22, wherein the back S2 of the pump fluid end is proximal the pump power end 12, upon integration therewith via integration section 11. Locations described as front S1, back S2, top S3, and bottom S4 are further described with reference to the x-y-z coordinate system shown in FIG. 1 and further can be relative to a surface (e.g., a trailer bed, the ground, a platform, etc.) upon which the pump 10 is located, a bottom S4 of the pump fluid end being proximal the surface (e.g., trailer bed) upon which the pump 10 is located. Generally, due to size and positioning of pump 10, the front S1 and top S3 of the pump fluid end 22 are more easily accessible than a back S2 or bottom S4 thereof. In a similar manner, a front of pump 10 is distal the pump power end 12 and a back of the pump 10 is distal the pump fluid end 22. The integration section 11 can be positioned in a space between the pump fluid end 22 and the pump power end 12, and can be safeguarded (e.g., from personnel) via a cover 15.

In embodiments, a pump fluid end 22 and pump 10 of this disclosure comprise at least one access port located on a side of the discharge valve assembly 72 opposite the suction valve assembly 56. For example, in the cross-bore pump fluid end 22 embodiment of FIG. 2A, top access port 50B is located on a side (e.g., top side) of discharge valve assembly 72 opposite suction valve assembly 56, while in the concentric bore pump fluid end 22 embodiment of FIG. 3, front access port 50A is located on a side (e.g., front side) of discharge valve assembly 72 opposite suction valve assembly 56.

In embodiments, one or more seals 29 (e.g., "o-ring" seals, packing seals, or the like), also referred to herein as 'primary' reciprocating element packing 29 (or "packing 29") may be arranged around the reciprocating element 18 to provide sealing between the outer walls of the reciprocating element 18 and the inner walls 26 defining at least a portion of the reciprocating element bore 24. The inner walls 26 may be provided by fluid end body 8 or a sleeve within reciprocating element bore 24, as described below. In some concentric bore fluid end designs, a second set of seals (also referred to herein as 'secondary' reciprocating element packing; not shown in the Figures) may be fixedly arranged around the reciprocating element 18 to provide sealing between the outer walls of the reciprocating element 18 and the inner walls of a low-pressure cylinder that defines the low pressure chamber described hereinabove (e.g., wherein the secondary packing is farther back along the x-axis and delineates a back end of the low pressure chamber that extends from the primary packing 29 to the secondary packing). In embodiments, only a primary reciprocating element packing is utilized, as fluid enters tail end 62 of reciprocating element 18 without first contacting an outer peripheral wall thereof (i.e., no secondary reciprocating element packing is needed/utilized, because no low pressure chamber external to reciprocating element 18 is utilized). Skilled artisans will recognize that the seals may comprise any suitable type of seals, and the selection of seals may depend on various factors e.g., fluid, temperature, pressure, etc.

While the foregoing discussion focused on a pump fluid end 22 comprising a single reciprocating element 18 disposed in a single reciprocating element bore 24, it is to be understood that the pump fluid end 22 may include any suitable number of reciprocating elements. As discussed further below, for example, the pump 10 may comprise a plurality of reciprocating elements 18 and associated reciprocating element bores 24 arranged in parallel and spaced apart along the z-axis of FIG. 1 (or another arrangement such as a V block or radial arrangement). In such a multi-bore pump, each reciprocating element bore may be associated with a respective reciprocating element and crank arm, and a single common crankshaft may drive each of the plurality of reciprocating elements and crank arms. Alternatively, a multi-bore pump may include multiple crankshafts, such that each crankshaft may drive a corresponding reciprocating element. Furthermore, the pump 10 may be implemented as any suitable type of multi-bore pump. In a non-limiting example, the pump 10 may comprise a Triplex pump having three reciprocating elements 18 (e.g., plungers or pistons) and associated reciprocating element bores 24, discharge valve assemblies 72 and suction valve assemblies 56, or a Quintuplex pump having five reciprocating elements 18 and five associated reciprocating element bores 24, discharge valve assemblies 72 and suction valve assemblies 56.

Reciprocating element bore 24 (and seals 29) can have an inner diameter slightly greater than the outer diameter of the reciprocating element 18, such that the reciprocating element 18 may sufficiently reciprocate within reciprocating element bore 24 and the seals 29 (optionally, within a sleeve, as described hereinbelow). In embodiments, the fluid end body 8 of pump fluid end 22 has a pressure rating ranging from about 100 psi to about 3000 psi, or from about 2000 psi to about 10,000 psi, from about 5000 psi to about 30,000 psi, or from about 3000 psi to about 50,000 psi or greater. The fluid end body 8 of pump fluid end 22 may be cast, forged, machined, printed or formed from any suitable materials, e.g., steel, metal alloys, or the like. Those versed in the art will recognize that the type and condition of material(s) suitable for the fluid end body 8 may be selected based on various factors. In a wellbore servicing operation, for example, the selection of a material may depend on flow rates, pressure rates, wellbore service fluid types (e.g., particulate type and/or concentration present in particle laden fluids such as fracturing fluids or drilling fluids, or fluids comprising cryogenic/foams), etc. Moreover, the fluid end body 8 (e.g., cylinder wall 26 defining at least a portion of reciprocating element bore 24 and/or pump chamber 28) may include protective coatings for preventing and/or resisting abrasion, erosion, and/or corrosion.

In embodiments, the cylindrical shape (e.g., providing cylindrical wall(s) 26) of the fluid end body 8 may be pre-stressed in an initial compression. Moreover, a high-pressure cylinder(s) providing the cylindrical shape (e.g., providing cylindrical wall(s) 26) may comprise one or more sleeves (e.g., heat-shrinkable sleeves). Additionally or alternatively, the high-pressure cylinder(s) may comprise one or more composite overwraps and/or concentric sleeves ("over-sleeves"), such that an outer wrap/sleeve pre-loads an inner wrap/sleeve. The overwraps and/or over-sleeves may be non-metallic (e.g., fiber windings) and/or constructed from relatively lightweight materials. Overwraps and/or over-sleeves may be added to increase fatigue strength and overall reinforcement of the components.

The cylinders and cylindrical-shaped components (e.g., providing cylindrical wall 26) associated with the pump fluid end body 8 of pump fluid end 22 may be held in place within the pump 10 using any appropriate technique. For example, components may be assembled and connected, e.g., bolted, welded, etc. Additionally or alternatively, cylinders may be press-fit (e.g., interference fit) into openings machined or cast into the pump fluid end 22 or other suitable portion of the pump 10. Such openings may be configured to accept and rigidly hold cylinders (e.g., having cylinder wall(s) 26 at least partially defining reciprocating element bore 24) in place so as to facilitate interaction of the reciprocating element 18 and other components associated with the pump 10.

In embodiments, the reciprocating element 18 comprises a plunger or a piston. While the reciprocating element 18 may be described herein with respect to embodiments comprising a plunger, it is to be understood that the reciprocating element 18 may comprise any suitable component for displacing fluid. In a non-limiting example, the reciprocating element 18 may be a piston. As those versed in the art will readily appreciate, a piston-type pump generally employs sealing elements (e.g., rings, packing, etc.) attached to the piston and movable therewith. In contrast, a plunger-type pump generally employs fixed or static seals (e.g., primary seal or packing 29) through which the plunger moves during each stroke (e.g., suction stroke or discharge stroke).

As skilled artisans will understand, the reciprocating element 18 may include any suitable size and/or shape for extending and retracting along a flow path within the pump fluid end 22. For instance, reciprocating element 18 may comprise a generally cylindrical shape, and may be sized such that the reciprocating element 18 can sufficiently slide against or otherwise interact with the inner cylinder wall 26. In embodiments, one or more additional components or mechanical linkages 48 (FIG. 4; e.g., clamps, adapters, extensions, etc.) may be used to couple the reciprocating element 18 to the pump power end 12 (e.g., to a pushrod 9).

In some embodiments (e.g., cross-bore pump fluid end 22 embodiments such as FIG. 2A), the reciprocating element may be substantially solid and/or impermeable (e.g., not hollow). In alternative embodiments (e.g., tee-bore pump fluid end 22 embodiment such as FIG. 2B and concentric bore pump fluid end 22 embodiment such as FIG. 3), the reciprocating element 18 comprises a peripheral wall defining a hollow body. Additionally (e.g., tee-bore pump fluid end 22 embodiments such as FIG. 2B and concentric bore pump fluid end 22 embodiments such as FIG. 3), a portion of the peripheral wall of reciprocating element 18 may be generally permeable or may include an input through which fluid may enter the hollow body and an output through which fluid may exit the hollow body. Furthermore, while the reciprocating element 18 may, in embodiments, define a substantially hollow interior and include a ported body, a base of the reciprocating element 18 proximal the pump power end 12, when assembled, may be substantially solid and/or impermeable (e.g., a plunger having both a hollow portion and a solid portion).

The reciprocating element 18 comprises a front or free end 60. In embodiments comprising concentric bore pump fluid end designs 22 such as shown in FIG. 3, the reciprocating element 18 can contain or at least partially contain the suction valve assembly 56. In one aspect, the suction valve assembly 56 is at least partially disposed within the reciprocating element 18 at or proximate to the front end 60 thereof. At an opposite or tail end 62 (also referred to as back end 62) of the reciprocating element 18, the reciprocating element 18 may include a base coupled to the pump power end 12 of the pump 10 (e.g., via crank arm 20). In embodiments, the tail end 62 of the reciprocating element 18 is coupled to the pump power end 12 outside of pump fluid end 22, e.g., within integration section 11.

As noted above, pump fluid end 22 contains a suction valve assembly 56. Suction valve assembly 56 may alternately open or close to permit or prevent fluid flow. Skilled artisans will understand that the suction valve assembly 56 may be of any suitable type or configuration (e.g., gravity- or spring-biased, flow activated, etc.). Those versed in the art will understand that the suction valve assembly 56 may be disposed within the pump fluid end 22 at any suitable location therein. For instance, the suction valve assembly 56 may be disposed within the bore 25 below central axis 17 of the pump fluid end 22, in cross-bore pump fluid end 22 designs such as FIG. 2A, such that a suction valve body (e.g., a poppet assembly) of the suction valve assembly 56 moves toward central axis 17 when the suction valve assembly 56 opening and away from the central axis 17 when the suction valve assembly 56 is closing. The suction valve assembly 56 may be disposed within reciprocating element bore 24 and at least partially within reciprocating element 18 in tee-bore pump fluid end 22 designs such as FIG. 2B and concentric bore pump fluid end 22 designs such as FIG. 3, such that a suction valve body (e.g., a poppet assembly) of the suction valve assembly 56 moves away from the reciprocating element 18 when the suction valve assembly 56 approaches an open configuration (i.e., is opening) and toward reciprocating element 18 when the suction valve assembly 56 approaches a closed configuration (i.e., is closing).

Pump 10 comprises a discharge valve assembly 72 for controlling the output of fluid through discharge chamber 53 and discharge outlet 54. Analogous to the suction valve assembly 56, the discharge valve assembly 72 may alternately open or close to permit or prevent fluid flow. Those versed in the art will understand that the discharge valve assembly 72 may be disposed within the pump chamber at any suitable location therein. For instance, the discharge valve assembly 72 may be disposed within the bore 25 proximal the top S3 of the pump fluid end 22, in cross-bore pump fluid end 22 designs such as FIG. 2A and tee-bore pump fluid end 22 designs such as FIG. 2B, such that a discharge valve body (e.g., a poppet assembly) of the discharge valve assembly 72 moves toward the discharge chamber 53 when the discharge valve assembly 72 approaches an open configuration and away from the discharge chamber 53 when the discharge valve assembly 72 approaches a closed configuration. The discharge valve assembly 72 may be disposed proximal the front S1 of bore 24 of the pump fluid end 22 (e.g., at least partially within discharge chamber 53 and/or pump chamber 28) in concentric bore pump fluid end 22 designs such as FIG. 3, such that a discharge valve body (e.g., poppet assembly) of the discharge valve assembly 72 moves toward the discharge chamber 53 when the discharge valve assembly 72 approaches an open configuration and away from the discharge chamber 53 when the discharge valve assembly 72 approaches a closed configuration. In addition, the discharge valve assembly 72 may be co-axially aligned with the suction valve assembly 56 (e.g., along central axis 17 in concentric bore pump fluid end 22 configurations such as FIG. 3 or along central axis 27 of bore 25 perpendicular to central axis 17 in cross-bore pump fluid end 22 configurations such as FIG. 2A and FIG. 2B). In concentric bore pump fluid end 22 configurations such as FIG. 3, the suction valve assembly 56 and the discharge valve assembly 72 may be coaxially aligned with the reciprocating element 18 (e.g., along central axis 17).

Further, the suction valve assembly 56 and the discharge valve assembly 72 can comprise any suitable mechanism for opening and closing valves. For example, the suction valve assembly 56 and the discharge valve assembly 72 can comprise a suction valve spring and a discharge valve spring, respectively. Additionally, any suitable structure (e.g., valve assembly comprising sealing rings, stems, valve guides, poppets, etc.) and/or components may be employed for retaining the components of the suction valve assembly 56 and the components of the discharge valve assembly 72 within the pump fluid end 22. For example, the discharge valve assembly 72 and/or the suction valve assembly 56 can comprise a valve poppet, as described, for example, in U.S. patent application Ser. No. 16/436,356 filed Jun. 10, 2019 and entitled "Multi-Material Frac Valve Poppet", the disclosure of which is hereby incorporated herein in its entirety for purposes not contrary to this disclosure. The suction valve assembly 56 can comprise a suction valve seat and a suction valve body, and/or the discharge valve assembly 72 can comprise a discharge valve seat and a discharge valve body. The suction valve body and the discharge valve body can be any known valve bodies, for example, movable valve poppets, and can be wing guided and/or stem guided, or a combination thereof.

The fluid inlet 38 may be arranged within any suitable portion of the pump fluid end 22 and configured to supply fluid to the pump in any direction and/or angle. Moreover, the pump fluid end 22 may comprise and/or be coupled to any suitable conduit (e.g., pipe, tubing, or the like) through which a fluid source may supply fluid to the fluid inlet 38. The pump 10 may comprise and/or be coupled to any suitable fluid source for supplying fluid to the pump via the fluid inlet 38. In embodiments, the pump 10 may also comprise and/or be coupled to a pressure source such as a boost pump (e.g., a suction boost pump) fluidly connected to the pump 10 (e.g., via inlet 38) and operable to increase or "boost" the pressure of fluid introduced to pump 10 via fluid inlet 38. A boost pump may comprise any suitable type including, but not limited to, a centrifugal pump, a gear pump, a screw pump, a roller pump, a scroll pump, a piston/plunger pump, or any combination thereof. For instance, the pump 10 may comprise and/or be coupled to a boost pump known to operate efficiently in high-volume operations and/or may allow the pumping rate therefrom to be adjusted. Skilled artisans will readily appreciate that the amount of added pressure may depend and/or vary based on factors such as operating conditions, application requirements, etc. In one aspect, the boost pump may have an outlet pressure greater than or equal to about 70 psi, about 80 psi, or about 110 psi, providing fluid to the suction side of pump 10 at about said pressures. Additionally or alternatively, the boost pump may have a flow rate of greater than or equal to about 80 BPM, about 70 BPM, and/or about 50 BPM.

As noted hereinabove, the pump 10 may be implemented as a multi-cylinder pump comprising multiple cylindrical reciprocating element bores 24 and corresponding components. In embodiments, the pump 10 is a Triplex pump in which the pump fluid end 22 comprises three reciprocating assemblies, each reciprocating assembly comprising a suction valve assembly 56, a discharge valve assembly 72, a pump chamber 28, a fluid inlet 38, a discharge outlet 54, and a reciprocating element bore 24 within which a corresponding reciprocating element 18 reciprocates during operation of the pump 10 via connection therewith to a (e.g., common) pump power end 12. In embodiments, the pump 10 is a Quintuplex pump in which the pump fluid end 22 comprises five reciprocating assemblies. In a non-limiting example, the pump 10 may be a Q-10™ Quintuplex Pump or an HT-400™ Triplex Pump, produced by Halliburton Energy Services, Inc.

In embodiments, the pump fluid end 22 may comprise an external manifold (e.g., a suction header) for feeding fluid to the multiple reciprocating assemblies via any suitable inlet(s). Additionally or alternatively, the pump fluid end 22 may comprise separate conduits such as hoses fluidly connected to separate inlets for inputting fluid to each reciprocating assembly. Of course, numerous other variations may be similarly employed, and therefore, fall within the scope of the present disclosure.

Those skilled in the art will understand that the reciprocating elements of each of the reciprocating assemblies may be operatively connected to the pump power end 12 of the pump 10 according to any suitable manner. For instance, separate connectors (e.g., cranks arms/connecting rods 20, one or more additional components or mechanical linkages 48, pushrods 9, etc.) associated with the pump power end 12 may be coupled to each reciprocating element body or tail end 62. The pump 10 may employ a common crankshaft (e.g., crankshaft 16) or separate crankshafts to drive the multiple reciprocating elements.

As previously discussed, the fluid inlet(s) 38 may receive a supply of fluid from any suitable fluid source, which may be configured to provide a constant fluid supply. Additionally or alternatively, the pressure of supplied fluid may be increased by adding pressure (e.g., boost pressure) as described previously. In embodiments, the fluid inlet(s) 38 receive a supply of pressurized fluid comprising a pressure ranging from about 30 psi to about 300 psi.

Additionally or alternatively, the one or more discharge outlet(s) 54 may be fluidly connected to a common collection point such as a sump or distribution manifold, which may be configured to collect fluids flowing out of the fluid outlet(s) 54, or another cylinder bank and/or one or more additional pumps.

During pumping, the multiple reciprocating elements 18 will perform forward and returns strokes similarly, as described hereinabove. In embodiments, the multiple reciprocating elements 18 can be angularly offset to ensure that no two reciprocating elements are located at the same position along their respective stroke paths (i.e., the plungers are "out of phase"). For example, the reciprocating elements may be angularly distributed to have a certain offset (e.g., 120 degrees of separation in a Triplex pump) to minimize undesirable effects that may result from multiple reciprocating elements of a single pump simultaneously producing pressure pulses. The position of a reciprocating element is generally based on the number of degrees a pump crankshaft (e.g., crankshaft 16) has rotated from a bottom dead center (BDC) position. The BDC position corresponds to the position of a fully retracted reciprocating element at zero velocity, e.g., just prior to a reciprocating element moving (i.e., in a direction indicated by arrow 117 in FIGS. 2A-2B and FIG. 3) forward in its cylinder. A top dead center position corresponds to the position of a fully extended reciprocating element at zero velocity, e.g., just prior to a reciprocating element moving backward (i.e., in a direction indicated by arrow 116 in FIGS. 2A-2B and FIG. 3) in its cylinder.

As described above, each reciprocating element 18 is operable to draw in fluid during a suction (backward or return) stroke and discharge fluid during a discharge (forward) stroke. Skilled artisans will understand that the multiple reciprocating elements 18 may be angularly offset or phase-shifted to improve fluid intake for each reciprocating element 18. For instance, a phase degree offset (at 360 degrees divided by the number of reciprocating elements) may be employed to ensure the multiple reciprocating elements 18 receive fluid and/or a certain quantity of fluid at all times of operation. In one implementation, the three reciprocating elements 18 of a Triplex pump may be phase-shifted by a 120-degree offset. Accordingly, when one reciprocating element 18 is at its maximum forward stroke position, a second reciprocating element 18 will be 60 degrees through its discharge stroke from BDC, and a third reciprocating element will be 120 degrees through its suction stroke from top dead center (TDC).

Figure 5:
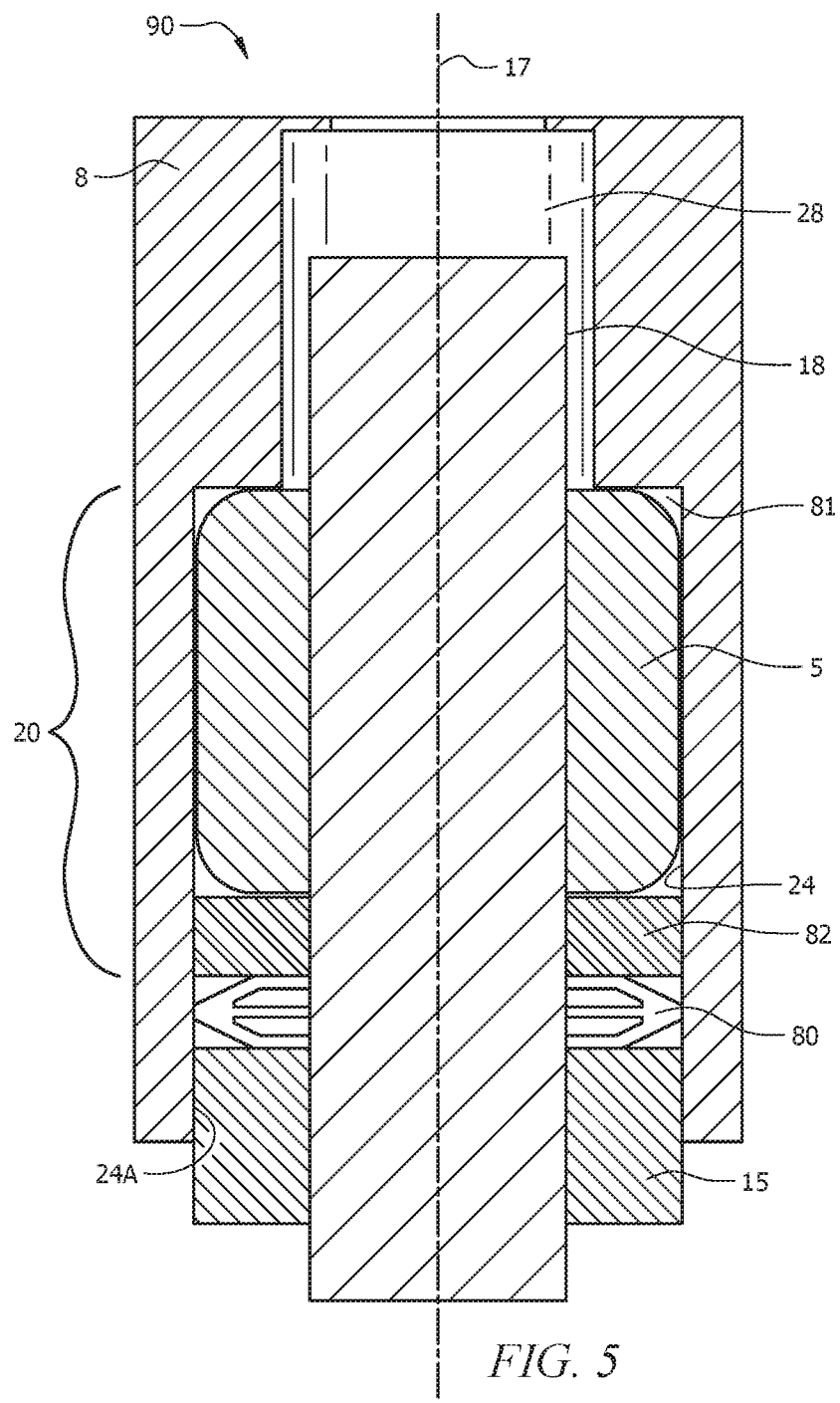
FIG. 5 is a schematic of a packing system according to embodiments of this disclosure.

Herein disclosed is a packing system for a pump 10. According to embodiments of this disclosure, seal or packing 29 of FIG. 2A, FIG. 2B, and FIG. 3 described hereinabove is provided by a packing system 20 comprising one or more springs, as described hereinbelow with reference to FIGS. 8-14. With reference now to FIG. 5, which is a schematic of a packing system 90 according to embodiments of this disclosure, the packing system 90 comprises: a packing stack 20 (also referred to herein as a "packing assembly 20" or simply an "assembly 20"); one or more springs 80; and a terminal component 15 (also referred to herein as a "seal compression actuator 15"). Packing stack 20 comprises a packing 5 (also referred to as a "seal 5" or "packer 5"). Packing 5 is cylindrical and compressible such that the packing 5 can fill a void volume 81 in a reciprocating element bore 24 of the pump 10. The terminal component 15 is configured for sealing a terminus 24A of the reciprocating element bore 24. The one or more springs 80 can be positioned between the terminal component 15 and the packing 5 (or elsewhere within (e.g., between adjacent components of packing stack 20) and/or adjacent packing stack 20 (e.g., adjacent a front-most component of packing stack 20 and/or adjacent a back-most component of packing stack 20) to provide a sufficient force on the packing 5 to maintain compression of the packing 5 within the void volume 81. As detailed further hereinbelow with reference to FIGS. 8-13, packing stack 20 can comprise one or more components 82, one or more of which components 82 can be positioned between packing 5 and the one or more springs 80. As described with reference to FIGS. 8-13 hereinbelow, the one or more components 82 can include, for example, a sealing adapter 20' (e.g., comprising a bearing retainer 1 and/or a bearing 2), a bearing retainer 1, a bearing 2, a packing carrier 20" (e.g., comprising a bearing retainer 1, a bearing 2, and/or a packing adapter 3), a packing adapter 3, a backup ring 4, a header ring 6, a header ring adapter 7, or a combination thereof.

By employing one or more springs 80, the packing system 90 of this disclosure provides for maintenance of compression of packing 5 during an effective life of the packing 5. Packing 5 is generally used for sealing dynamic gaps where volumetric or size changes of the packing 5 and/or the gaps (e.g., void volume 81) being sealed are encountered during operation of a pump 10 comprising the packing system 90. For example, void volume 81 can change in shape and volume as packing 5 and/or reciprocating element 18 wears, for example, due to abrasion. The packing system 90 of this disclosure can be utilized to insure that the shape and amount of compression of packing 5 enable the packing system 90 of this disclosure to maintain sealing effectiveness throughout an extended lifetime, relative to a lifetime of a packing system absent the one or more springs 80. As detailed hereinbelow, the herein disclosed packing system 90 utilizes the one or more springs 80 as a simple and effective compression system.

As detailed further hereinbelow with reference to the exemplary packing stack 20 of FIGS. 8-13, a packing stack 20 of this disclosure comprises one or more packings or seals 5, for sealing the moving reciprocating element 18 within reciprocating element bore 24. Packing stack 20 can include one or more individual sealing elements, such as packing(s) 5. Packing(s) 5 is compressed or packed, such that it completely fills in the designated void volume 81, hindering or preventing migration of fluids being pumped from chamber 28 through void volume 81. Terminal component 15 can comprise a compression actuator operable to compress the packing 5 until it deforms to fill the void volume 81 around it. For example, terminal component 15 can comprise a packing screw or nut 15A, which is operable to compress the packing stack 20. As discussed further hereinbelow, packing 5 can comprise a rubbery compound, such that packing 5 can easily conform to the shape of void volume 81. The one or more components 82 of packing stack 20 can comprise a seal compression interface (e.g., a seal adapter 20' or bearing retainer 1, described further hereinbelow with reference to FIGS. 8-13) that can provide a hard-faced surface so that the terminal component 15 (e.g., a nut) can turn freely without resistance from the elastomeric material of packing 5.

Packing system 90 comprises one or more springs 80. The one or more springs 80 can comprise one or more helical springs, one or more frusto-conical springs, or a combination thereof. In embodiments, the one or more springs 80 comprise a Belleville spring. Packing system 90 can comprise a plurality of Bellville springs. In such embodiments, the plurality of Belleville springs can be arranged in series, in parallel, or a combination thereof (i.e., in series-parallel). The one or more springs 80 can be nested, arranged back to back, front to back, front to front, or a combination thereof. The one or more springs 80 can expand an axial distance (e.g., in a direction parallel to central axis 17 of reciprocating element bore 24) while maintaining the force on the packing stack 20 (e.g., on packing 5). A number and/or an arrangement of the one or more springs 80, and/or a plate thickness and/or an initial deformation of each of the one or more springs 80 can be selected such that the one or more springs 80 can expand an axial distance parallel to the central axis 17 while maintaining a force on the packing 5 that maintains compression of the packing 5 within the void volume 81. (This force can be referred to as a "sufficient force".) The axial distance can be at least 0.05, 0.06, 0.07, 0.08, 0.09, or 0.1 inch (1.3, 1.5, 1.8, 2.0, 2.3, or 2.5 mm). The one or more springs 80 can be springs that provide a force exerted on the packing 5 that increases as the one or more springs 80 expand in the axial direction. For example, as the packing stack 20 wears, the configuration of the one or more springs 80 can be designed to provide increased axial force as the one or more springs 80 expand axially against the worn packing. This latter behavior can, in embodiments be provided by (e.g., conical) Bellville springs.

As noted above, the one or more springs 80 can include one or more springs 80 for which the force exerted on the packing 5/packing stack 20 by the one or more springs 80 increases as the one or more springs 80 expand in the axial direction parallel to the central axis 17 of the reciprocating element bore 24. Such springs include Bellville springs.

In embodiments, the one or more springs 80 (e.g., one, two, or more Belleville springs 80) are positioned between the packing stack 20 and the terminal component 15 of packing system 90. Different placements of the one or more springs 80 are also possible, and are within the scope of this disclosure. For example, as detailed hereinbelow with reference to FIGS. 8-13, packing stack 20 can comprise, in addition to packing 5, a bearing retainer 1, a bearing 2, a packing adapter 3, a backup ring 4, a header ring 6, and/or a header ring adapter 7. One of the one or more springs 80 can be positioned, for example, within packing stack 20. In embodiments, the one or more springs 80 include a spring 80 in contact with back surface 1B of bearing retainer 1, a spring 80 between bearing retainer 1 and packing adapter 3 (e.g., in contact with bearing retainer front surface 1A of bearing retainer 1 and packing adapter back surface 3B of packing adapter 3), a spring 80 in contact with header ring adapter front surface 7A of header ring adapter 7, or a spring located elsewhere within packing stack 20.

Figure 6:
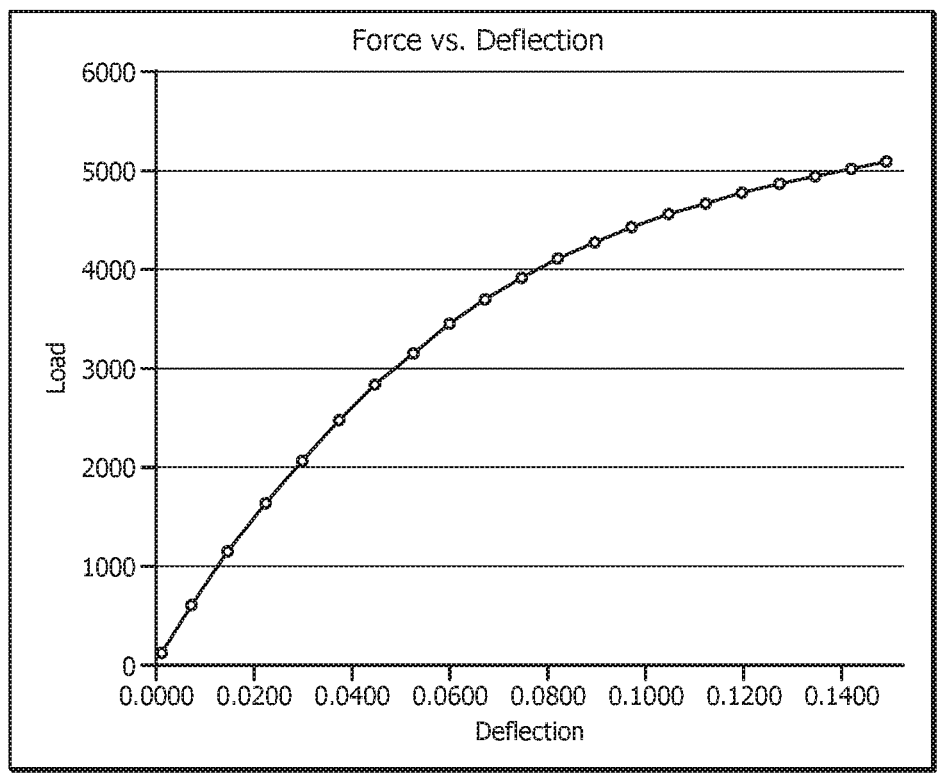
FIG. 6 is a spring force chart for a spring of a packing system, according to embodiments of this disclosure.
Figure 7:
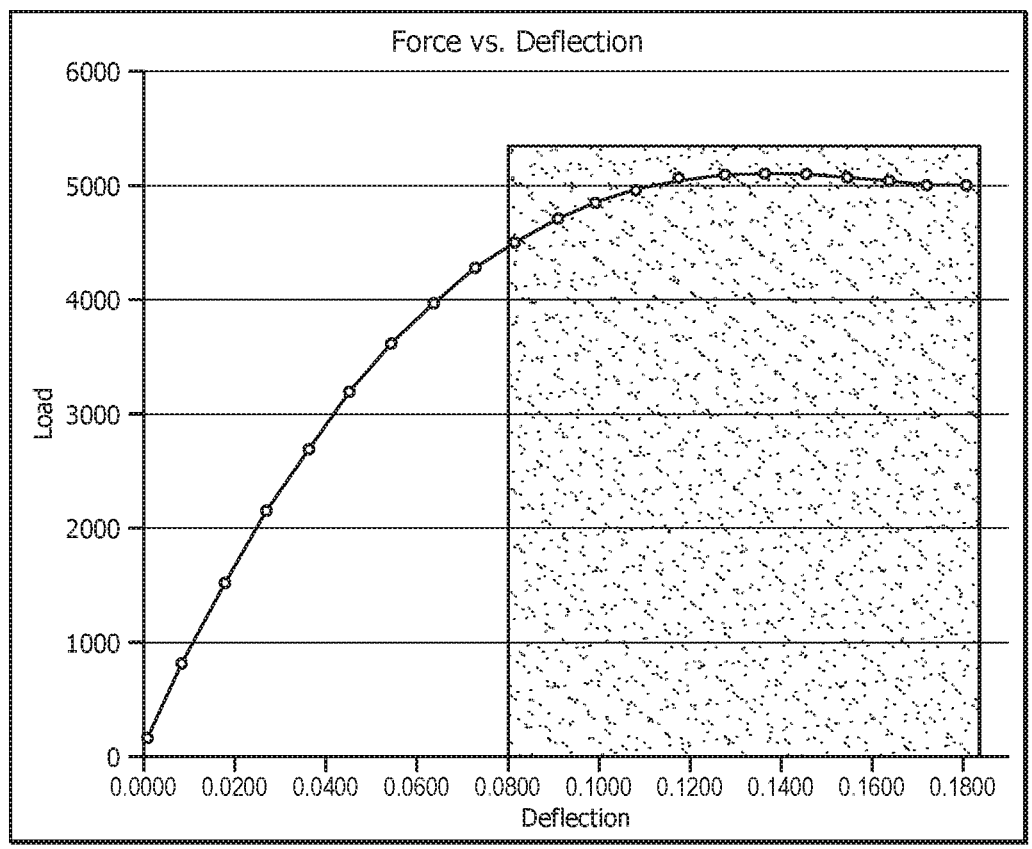
FIG. 7 is a spring force chart for a Belleville spring of a packing system, according to embodiments of this disclosure.

Belleville springs may be particularly useful as one or more springs 80 in a packing system 90 of this disclosure due to compactness, and flattening of the spring force curve at high compressions. That is, at the designed compression, one or more Belleville springs 80 may deliver almost similar forces when the springs are designed correctly. By way of example, FIG. 6, which is a spring force chart for a spring 80 of a packing system 90, according to embodiments of this disclosure, shows the load as a function of deflection of a spring having a plate thickness of 0.125", and a cup depth of 0.15". As depicted in FIG. 7, which is a spring force chart for a Belleville spring 80 of a packing system 90, according to embodiments of this disclosure, changing the stroke lengths to 0.18", plate thickness to 0.117", etc. can vary the force model drastically. The thickness of the spring 80 of FIG. 7 exhibits a force value is almost flat through half of its full stroke. Using a packing system 90 of this disclosure can provide for maintaining compression of the seals/packing 5 without the conventionally encountered need for external mechanical adjustments (e.g., tightening of the packing screw 15A). As seen in FIG. 7, the spring 80 could expand almost 0.1 inch (2.5 mm), thus replacing the need for frequent re-adjusting of the terminal component of seal compression actuator 15. Until spring 80 expands to that degree, the packing stack continues to be compressed properly, and the sealing task is successfully achieved.

As will be detailed further hereinbelow with reference to FIGS. 8-13, the packing stack 20 can further comprise: a packing carrier (also referred to as a "lantern ring") 20", wherein the packing carrier 20" is cylindrical and has an inside surface 20"C, an outside surface 20"D, a front surface 20"A, and a back surface 20"B; an o-ring 19; a packing lube seal 9; a backup ring 4, wherein the backup ring 4 is cylindrical, and has a backup ring front surface 4A and a backup ring back surface 4B; a header ring 6, wherein the header ring 6 is cylindrical, and wherein the header ring 6 has a header ring front surface 6A and a header ring back surface 6B; and/or a header ring adapter (also known as a "junk ring") 7, wherein the header ring adapter 7 has a header ring adapter front surface 7A and a header ring adapter back surface 7B, wherein, when assembled: the o-ring 19 is positioned in a groove G1 in the packing carrier outside surface 20"D; the packing lube seal 9 is in contact with the packing carrier inside surface 20"C and in fluid communication with a hole H1 extending from the packing carrier outside surface 20"D to the packing carrier inside surface 20"C; the backup ring back surface 4B is adjacent the packing carrier front surface 20"A; a packing back surface 5B of the packing 5 is adjacent the backup ring front surface 4A; the header ring back surface 6B is adjacent a packing front surface 5A of the packing 5; and/or the header ring adapter back surface 7B is adjacent the header ring front surface 6A. The packing carrier 20" can comprise a seal adapter 20' and a packing adapter 3, wherein the seal adapter 20' comprises a bearing retainer 1 and a bearing 2, wherein the bearing retainer 1 is cylindrical, and has a bearing retainer inside surface 1C and a bearing retainer outside surface 1D, and wherein the bearing retainer 1 comprises a (e.g., first) cavity C1 along the bearing retainer inside surface 1C, and wherein the bearing 2 is cylindrical, wherein the bearing 2 has a bearing outside surface 2D, a bearing inside surface 2C, a bearing front surface 2A and a bearing back surface 2B, and wherein, when the packing stack 20 is assembled, the bearing 2 is at least partially within the (e.g., first) cavity C1, such that the bearing outside surface 2D and the bearing back surface 2B are in contact with the bearing retainer inside surface 1C; and wherein the packing adapter 3 is cylindrical, wherein the packing adapter 3 has a packing adapter inside surface 3C, a packing adapter outside surface 3D, and a packing adapter front surface 3A, and wherein the packing adapter front surface 3A has a non-linear cross section. The packing adapter 3 and the bearing retainer 1 can be integrated as a single, unitary piece 13; or the packing adapter 3 and the bearing retainer 1 can be disparate components, wherein the bearing retainer 1 further has a bearing retainer front surface 1A and a bearing retainer back surface 1B, wherein the packing adapter 3 further comprises a packing adapter back surface 3B, and wherein, in the assembled configuration of the packing stack 20, the bearing front surface 2A is axially aligned along a central axis 17A of the packing stack 20 with the bearing retainer front surface 1A, and the packing adapter back surface 3B abuts the bearing retainer front surface 1A.

According to embodiments of this disclosure, packing system 90 comprises a packing stack or packing stack 20 comprising a packing 5. The packing stack 20 can further comprise one or more components 82 in addition to packing(s) 5. In embodiments, the one or more components 82 include a bearing retainer and a bearing. Such a packing stack 20 (referred to in U.S. patent application Ser. No. 16/804,542 as a "packing assembly" 20) is described in U.S. patent application Ser. No. 16/804,542, filed Feb. 28, 2020 which is entitled, "Frac Pump Plunger Centering Bearing to Avoid Premature Carrier, Packing, or Plunger Failure," and the disclosure of which is hereby incorporated herein in its entirety for purposes not contrary to this disclosure. Description of such a packing stack 20 will now be made with reference to FIG. 8, which is a schematic cross section view of a packing stack 20, according to embodiments of this disclosure. The components 82 of packing stack 20 of FIG. 8 comprises, in addition to packing 5, a bearing retainer 1, a bearing 2, a packing adapter 3, a backup ring 4, a header ring 6, a header ring adapter 7, and a packing lube seal 9. A packing stack 20 can comprise, in addition to packing(s) 5, a seal adapter 20' comprising a bearing retainer 1 and bearing 2, and can further comprise one or more of the additional components depicted in FIG. 8 and described hereinbelow. Reference to front, back, inside, and outside with reference to surfaces and components of packing stack 20 are relative terms, with "front" being opposite "back" and "inside" being opposite "outside". "Front" can refer to surfaces or ends of a component toward front S1 of a pump fluid end 22 of a pump 10 (FIGS. 1-3), when the packing stack 20 is positioned therein; "back" can refer to surfaces or ends of the component toward back S2 of pump fluid end 22 of pump 10 (FIGS. 1-3), when the packing stack 20 is positioned therein; "inside" can refer to surfaces or ends of the component proximate central axis 17 of reciprocating element bore 24 of pump fluid end 22 of pump 10 (FIGS. 1-3), when the packing stack 20 is positioned therein; and "outside" can refer to surfaces or ends of the component distal central axis 17 of reciprocating element bore 24 of pump fluid end 22 of pump 10 (FIGS. 1-3), when the packing stack 20 is positioned therein.

Figure 9:
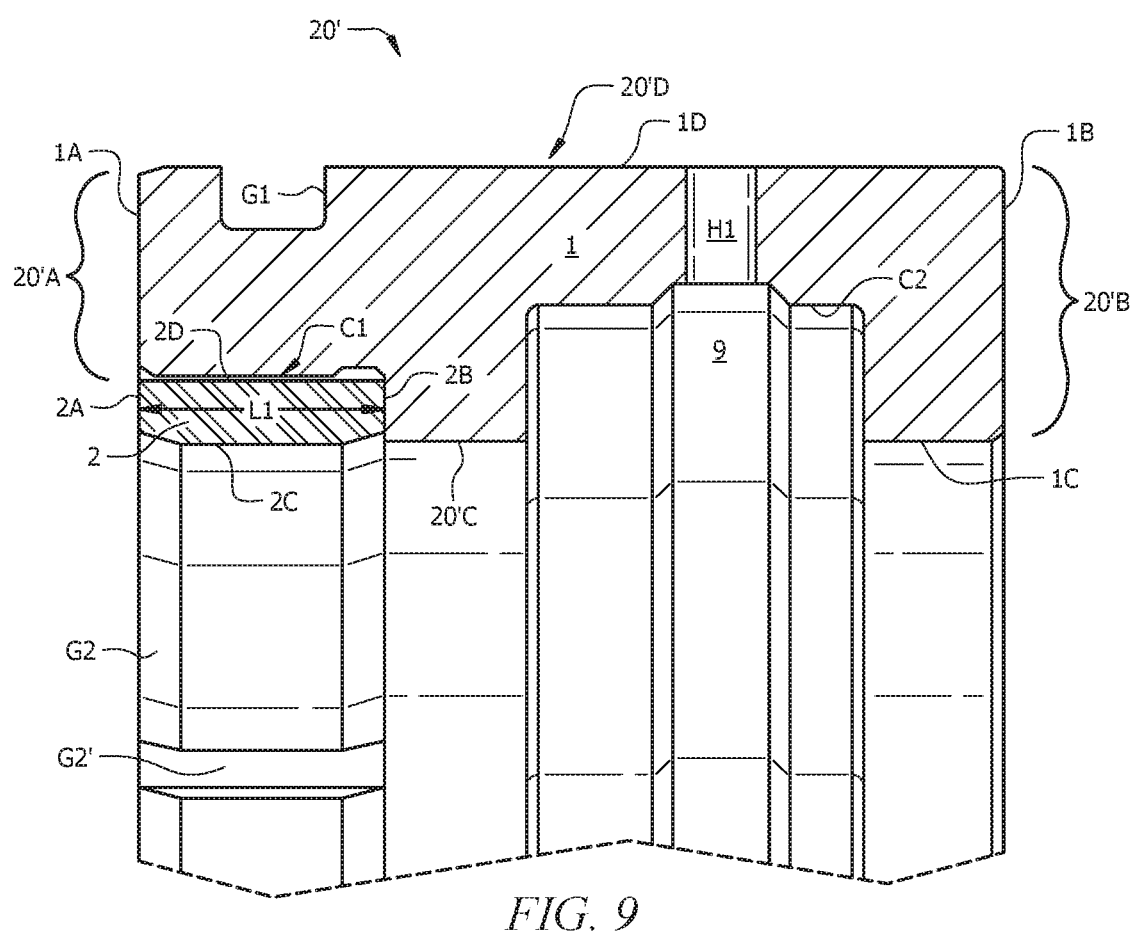
FIG. 9 is a schematic cross section view of a seal adapter, according to embodiments of this disclosure.

The term "seal adapter" is utilized herein to refer to an assembly comprising bearing retainer 1 and bearing 2. Packing stack 20 can comprise a seal adapter 20' comprising: bearing retainer 1 and bearing 2. As depicted in FIG. 9, which is a schematic of a seal adapter 20' according to embodiments of this disclosure, bearing retainer 1 is cylindrical and has a bearing retainer front surface 1A, a bearing retainer back surface 1B, a bearing retainer inside surface 1C and a bearing retainer outside surface 1D. Bearing retainer 1 comprises a first cavity C1 and a second cavity C2 along the bearing retainer inside surface 1C.

In embodiments in which bearing retainer 1 and packing adapter 3 are disparate components (such as depicted in FIGS. 8-10A), bearing retainer front surface 1A can be complementarily shaped with a packing adapter back surface 3B. For example, bearing retainer front surface 1A and packing adapter back surface 3B can be substantially perpendicular to central axis 17A of packing stack 20. Bearing retainer back surface 1B can be substantially perpendicular to central axis 17A of packing stack 20. Bearing retainer outside surface 1D can be substantially parallel with central axis 17A of packing stack 20.

First cavity C1 of bearing retainer 1 can be configured for retaining bearing 2 therein. Second cavity C2 of bearing retainer 1 can be configured for positioning at least partially therein of a packing lube seal 9, which is described further hereinbelow, therein. Generally, first cavity C1 of bearing retainer 1 and second cavity C2 of bearing retainer 1 can be disposed along inside surface 1C of bearing retainer 1 and have a shape complementary to that of bearing 2 and packing lube seal 9, respectively, such that bearing 2 can be retained within first cavity C1 of bearing retainer 1 and packing lube seal 9 can be retained within second cavity C2 of bearing retainer 1. By way of non-limiting examples, first cavity C1 and second cavity C2 of bearing retainer 1 can have a cross sectional shape that is hemispherical, spherical, cylindrical, rectilinear, rectangular, square, or another shape.

Figure 8:
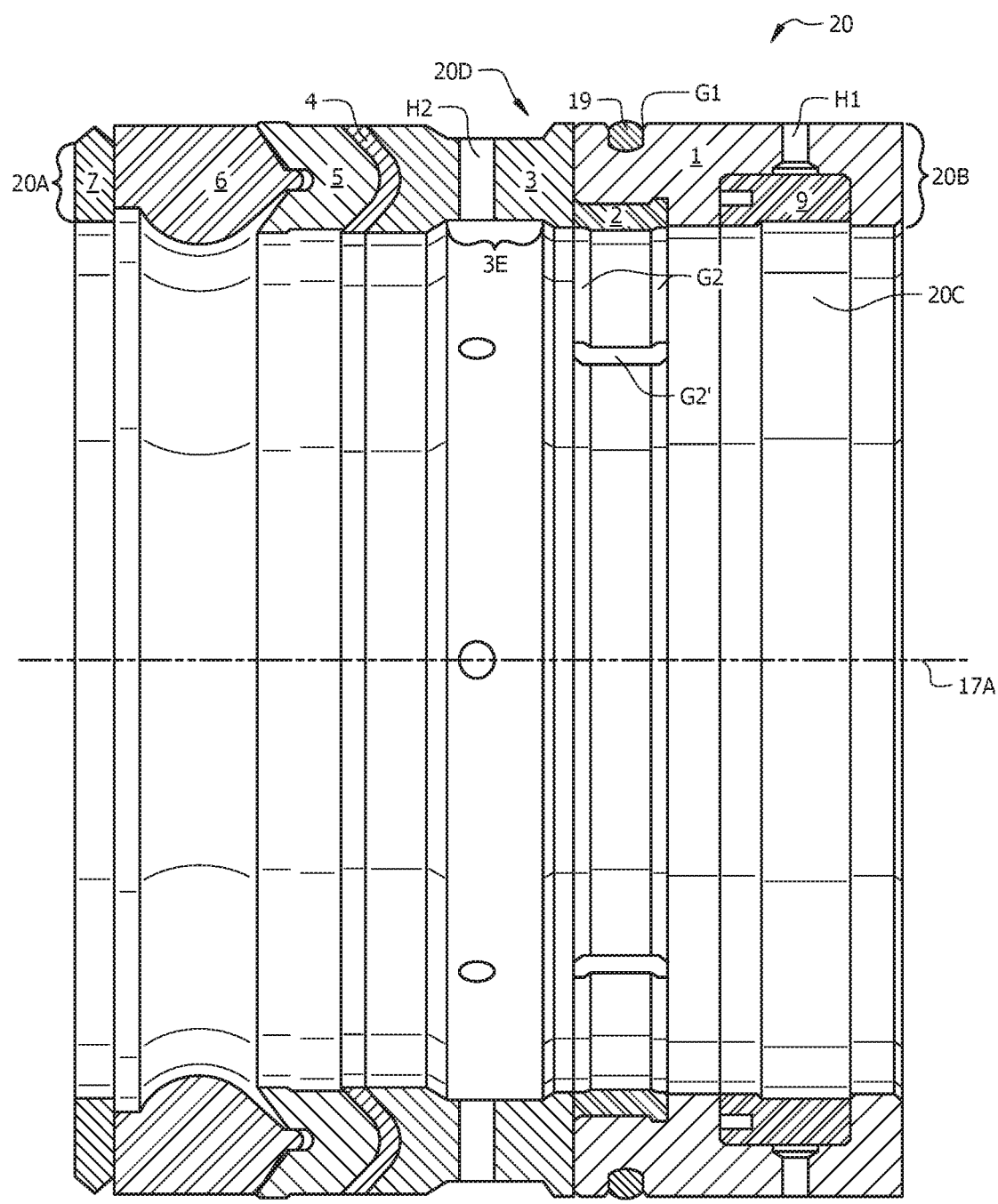
FIG. 8 is a schematic cross section view of a packing stack, according to embodiments of this disclosure.

Bearing retainer outside surface 1D of bearing retainer 1 can further comprise and define one or more grooves G1, such as depicted in FIG. 8. Each of the one or more grooves G1 can be configured for positioning therein of a component, such as an o-ring 19. The component, such as o-ring 19, can limit the travel of packing lubrication being introduced from packing adapter outside surface 3D into hole H2 of packing adapter 3, such that the lubricant travels into hole H2 toward inside surface of packing adapter 3C so that the lubricant contact, wets, and/or lubricates the reciprocating element 18 reciprocating within packing stack 20. In embodiments, a groove G1 is located axially distal back surface 1B of bearing retainer 1. For example, as depicted in FIG. 8, groove G1 is situated proximate front surface 1A of bearing retainer 1, proximate first cavity C1 of bearing retainer 1. The one or more grooves G1 can have any shape, such as hemispherical, spherical, cylindrical, rectilinear, rectangular, square, or another shape.

Bearing retainer 1 can further comprise one or more holes H1 extending from the bearing retainer outside surface 1D to the bearing retainer inside surface 1C. The one or more holes H1 can be configured to fluidly connect packing lube seal 9 with an outside or exterior 20D of the packing stack 20, such that a packing lubricant pressure difference can be limited from inside 20C of packing stack 20 to outside 20D thereof via the geometry of second cavity C2 and hole H1 of bearing retainer 1, which mitigates the possibility of pressure locking. As depicted in FIG. 8, a hole H1 can be located proximate bearing retainer back surface 1D at a back end 20B of the packing stack 20. The one or more holes H1 can have any cross sectional shape, such as hemispherical, spherical, cylindrical, rectilinear, rectangular, square, or another shape.

Packing stack 20 can further comprise packing lube seal 9 in contact with the bearing retainer inside surface 1C and in fluid communication with the one or more holes H1. Packing lube seal 9 can be operable to limit the travel of packing lubricant to an annulus limited by bearing retainer inside surface 1C, packing lube seal 9, and reciprocating element 18. When packing stack 20 is assembled, packing lube seal 9 is located at least partially within second cavity C2 of bearing retainer 1.

Bearing retainer 1 can be made of a material selected from bronze, steel (e.g., steel with a corrosion resistant surface treatment or coating such as chrome plate, nickel plate, physical vapor deposition (PVD) coating or similar), or a combination thereof.

Figure 10A:
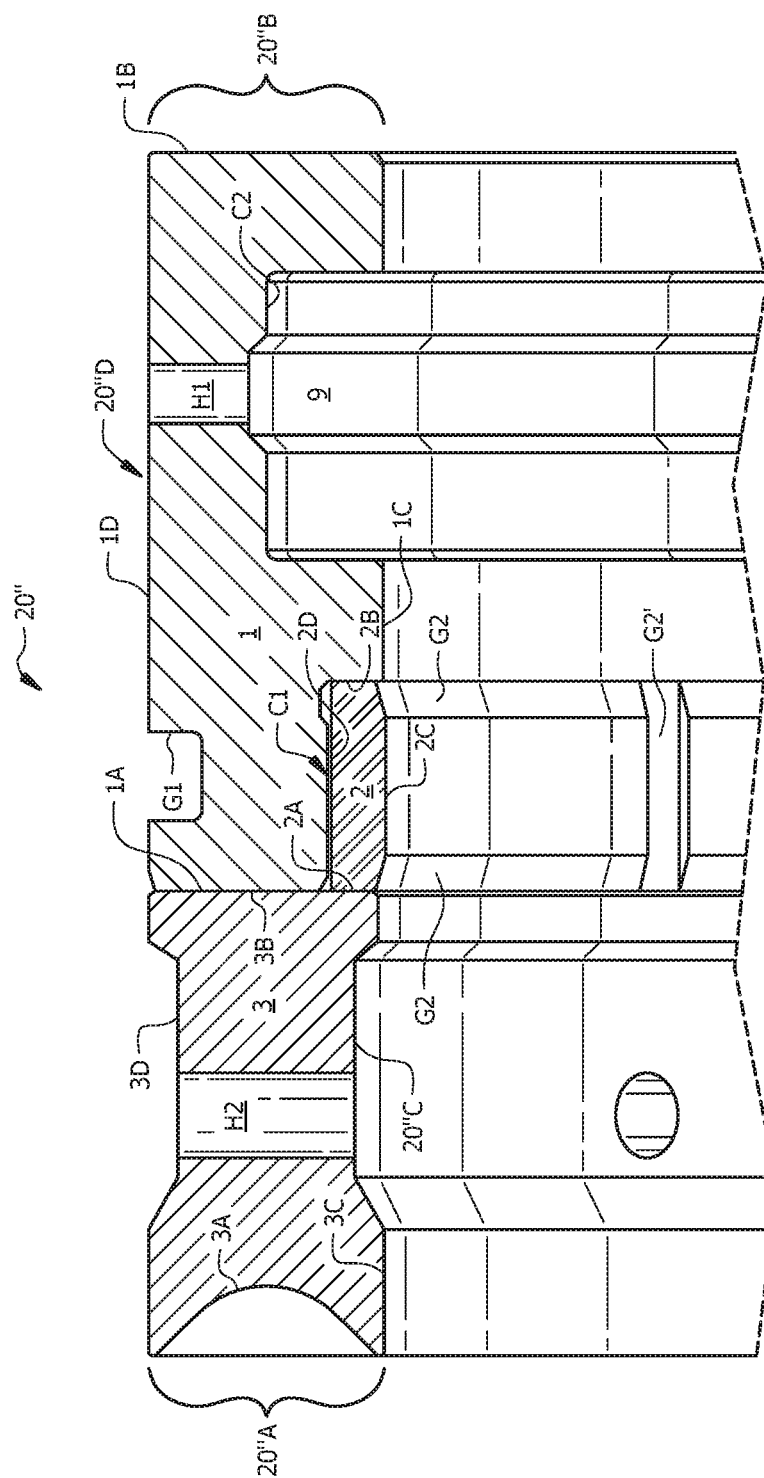
FIG. 10A is a schematic cross section view of a packing carrier, according to an embodiment of the present disclosure.
Figure 10B:
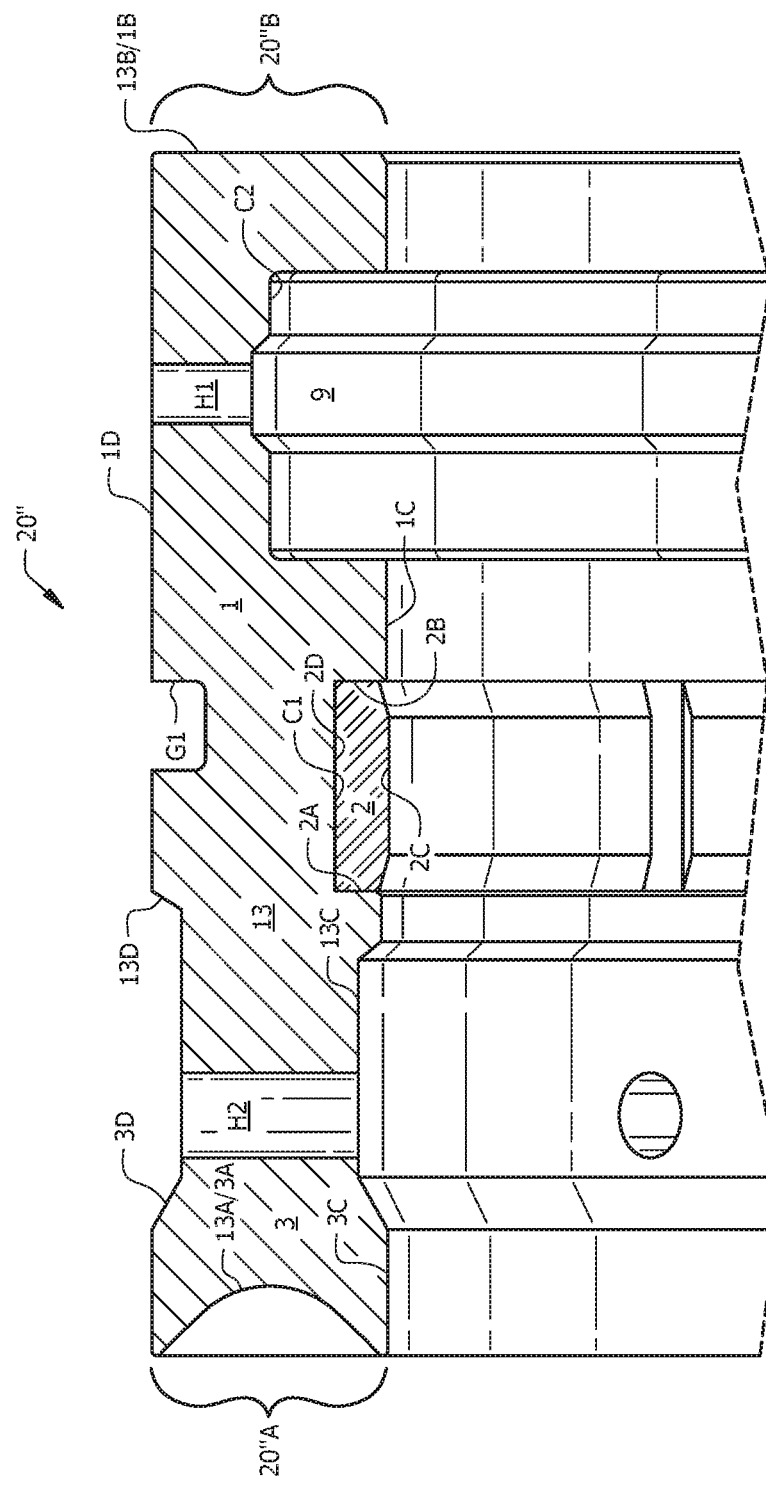
FIG. 10B is a schematic cross section view of a packing carrier, according to another embodiment of the present disclosure.

Bearing 2 serves to center the reciprocating element 18 within reciprocating element bore 24. FIG. 10A and FIG. 10B are schematic cross section views of packing carriers 20", according to embodiments of this disclosure. Bearing 2 is cylindrical, and has a bearing inside surface 2C, a bearing outside surface 2D, a bearing front surface 2A and a bearing back surface 2B. To act as a bearing, bearing inside surface 2C can have a smaller diameter than bearing retainer inside surface 1C and packing adapter inside surface 3C in order to prevent the reciprocating element 18 from contacting with bearing retainer inside surface 1C or the packing adapter inside surface 3C. (That is, bearing inside surface 2C of bearing 2 is closer to central axis 17A of packing stack 20 than bearing retainer inside surface 1C of bearing retainer 1 and packing adapter inside surface 3C of packing adapter 3 are to central axis 17A of packing stack 20.) In the assembled configuration of the packing stack 20/seal adapter 20'/packing carrier 20", the bearing 2 is at least partially positioned within the first cavity C1 of bearing retainer 1. Bearing 2 can be, for example, press fit and/or interference fit into first cavity C1 of bearing retainer 1. For example, bearing 2 can be pressed into the bearing retainer 1 and then the inside diameter of bearing 2 can be machined to have an inner diameter that can be, for example, a few thousandths larger than the OD of the reciprocating element 18 to enforce centering of the reciprocating element 18 within reciprocating element bore 24. As detailed further hereinbelow, bearing 2 can be located between the packing header ring 6/packing 5 and the plunger lube seal 9 (i.e., bearing 2 can be located in a lubricated annulus between the packing carrier 20" and the reciprocating element 18, such that bearing 2 is lubricated with packing lube). As depicted in FIG. 10, the lubricated annulus 79 can extend between the inside surface 20C of packing stack 20 and the outside surface of reciprocating element 18 and can extend axially from the packing adapter 3 to the packing lube seal 9 that is disposed in second cavity C2 of bearing retainer 1. Packing 5 keeps slurry being pumped from entering this lubricated annulus 79. The lubrication within annulus 79 can comprise grease, biogrease, or oil, or a combination thereof. By positioning bearing 2 out of the slurry being pumped by pump 10 via utilization of a packing stack 20 of this disclosure, bearing 2 can be protected from damage due to the solid particles in the slurry. The packing stack 20 described herein, in which bearing 2 is positioned in the lubricated annulus 79, can also prevent or minimize damage to bearing 2 due to heat related to friction.

Conventionally, the all metal (e.g., bronze) packing carrier 20" (described further hereinbelow with reference to FIG. 10A and FIG. 10B) acts as a centering feature for the reciprocating element 18. The occasional contact of the very hard reciprocating element 18 with a conventional metal packing carrier may not be a problem. However frequent contact of the reciprocating element 18 with a conventional metal packing carrier can result in negative impacts on the packing carrier and related parts. Additionally, when this contact occurs, the reciprocating element 18 is already off center in the packing. By this disclosure, bearing 2 is utilized as a centering feature for packing stack 20.

During operation, the (e.g., polymer) bearing 2 may frequently contact the reciprocating element 18. However because of the close tolerance machined between the inside surface 2C of bearing 2 and the outside surface of the reciprocating element 18, bearing 2 will keep the reciprocating element 18 centered in the packing 5 of packing stack 20 while pumping (i.e., help the packing 5 to work as intended and avoid premature failure) and prevent the reciprocating element 18 from contacting the other metal (e.g., bronze or steel) components of the packing carrier 20", thus helping the packing carrier 20" and the reciprocating element 18 to work as intended and avoid premature failure.

The occasional contact of the very hard reciprocating element 18 with a conventional metal packing carrier may not be a problem. However frequent contact of the reciprocating element 18 with a conventional metal packing carrier can result in negative impacts on the packing carrier and related parts. Additionally, when this contact occurs, the reciprocating element 18 is already off center in the packing. By this disclosure, bearing 2 is utilized as a centering feature for packing stack 20.

During operation, the (e.g., polymer) bearing 2 may frequently contact the reciprocating element 18. However because of the close tolerance machined between the inside surface 2C of bearing 2 and the outside surface of the reciprocating element 18, bearing 2 will keep the reciprocating element 18 centered in the packing 5 of packing stack 20 while pumping (i.e., help the packing 5 to work as intended and avoid premature failure) and prevent the reciprocating element 18 from contacting the other metal (e.g., bronze or steel) components of the packing carrier 20", thus helping the packing carrier 20" and the reciprocating element 18 to work as intended and avoid premature failure.

In the embodiment of FIG. 8, FIG. 9, and FIG. 10A, bearing 2 is at least partially within the cavity C1 of bearing retainer 1, such that the bearing outside surface 2D and the bearing back surface 2B are in contact with the bearing retainer inside surface 1C defining first cavity C1 of bearing retainer 1.

Bearing 2 can further comprise one or a plurality of grooves G2 extending circumferentially about inside surface 2C of bearing 2. The one or the plurality of grooves G2 can be distributed axially along a length $L_{1_B}$ of the bearing 2 in an axial direction along central axis 17A of packing stack 20. In embodiments, the plurality of grooves G2 are connected by grooves G2', extending axially between pairs of the plurality of grooves G2. Grooves G2/G2' can be operable as relief grooves that allow grease/lubricant to communicate from entry at holes H2 to packing lube seal 9, thus maintaining a substantially uniform pressure on both sides (i.e., bearing front side or surface 2A and bearing back side or surface 2B). The axial grooves G2 can be positioned periodically around bearing 2 in the axial direction (e.g., along central axis 17A of packing stack 20) to prevent pressure locking of the reciprocating element 18 in the packing stack 20.

Bearing 2 can be made of a material selected from polymers (e.g., high density polyethylene (HDPE)) or similar, or a combination thereof. Generally, bearing 2 comprises a material that has a hardness less than a hardness of the bearing retainer 1 and the packing adapter 3 (i.e., bearing 2 is softer than the other components of the packing carrier 20"), while being sufficiently hard to maintain its geometry and function as a bearing.

As depicted in FIG. 8, packing stack 20 can further comprise a packing adapter 3, configured to adapt to backup ring 4, packing 5, and/or header ring 6. The term "packing carrier" is utilized herein to refer to an assembly comprising bearing retainer 1, bearing 2, and packing adapter 3. Such a packing carrier can also be referred to herein as a "lantern ring". For example, as depicted in FIG. 10A, a packing stack 20 of this disclosure can comprise a packing carrier 20" comprising a packing adapter 3 in addition to seal adapter 20' comprising bearing retainer 1 and bearing 2. Packing adapter 3 is cylindrical, and has a packing adapter front surface 3A, a packing adapter back surface 3B, a packing adapter inside surface 3C, and a packing adapter outside surface 3D.

Packing adapter 3 can be made of a material selected from bronze, steel, stainless steel, or high strength polymer, or a combination thereof.

In the embodiment of FIG. 10A, packing adapter 3 and the bearing retainer 1 are disparate components. In such embodiments, the bearing retainer 1 further has a bearing retainer front surface 1A and a bearing retainer back surface 1B, and the packing adapter 3 further comprises a packing adapter back surface 3B, and, in the assembled configuration of the packing stack 20/packing carrier 20", the bearing front surface 2A and the bearing retainer front surface 1A can contact the packing adapter back surface 3B. In embodiments, in the assembled configuration of the packing stack 20/packing carrier 20", the bearing front surface 2A can be axially aligned along central axis 17A of the packing stack 20/packing carrier 20" with the bearing retainer front surface 1A, and the packing adapter back surface 3B can abut the bearing retainer front surface 1A and the bearing front surface 2A.

Alternatively, as depicted in FIG. 10B, packing adapter 3 and bearing retainer 1 can be integrated as a single, unitary piece 13. In such embodiments, bearing retainer 1 doesn't have a distinct bearing retainer front surface 1A and packing adapter 3 doesn't have a distinct packing adapter back surface 3B. In such embodiments, continuous outside surface 13D of unitary piece 13 comprises outside surface 1D of bearing retainer 1 and outside surface 3D of packing adapter 3, continuous inside surface 13C of unitary piece 13 comprises inside surface 1C of bearing retainer 1 and inside surface 3C of packing adapter 3, front surface 13A of unitary piece 13 comprises front surface 3A of packing adapter 3, and back surface 13B of unitary piece 13 comprises back surface 1B of bearing retainer 1. In such a unitary piece embodiment, bearing 2 is positioned within first cavity C1 of unitary piece 13, when packing carrier 20" is assembled.

Packing adapter front surface 3A can be complementarily shaped with backup ring back surface 4B (described hereinbelow with reference to FIG. 8). In embodiments, the packing adapter front surface 3A of packing adapter 3 has a non-linear cross section. For example, without limitation, packing adapter front surface 3A can have a cylindrical cross-section. Packing adapter back surface 3B can be complementarily shaped with bearing retainer front surface 1A and/or bearing front surface 2A. Packing adapter back surface 3B can be substantially perpendicular to central axis 17A of packing stack 20. As depicted in FIG. 8, a central section 3E of packing adapter 3E can have a larger inside diameter and a smaller outside diameter from packing adapter front surface 3A and packing adapter back surface 3B, in embodiments.

Packing adapter 3 can further comprise one or more holes H2 extending from the packing adapter inside surface 3C to the packing adapter outside surface 3D. Hole(s) H2 can be positioned within central section 3E of packing adapter 3 having the smaller outside diameter and larger inside diameter than the remainder of packing adapter 3, whereby the hole(s) H2 communicate in an unobstructed fashion with the annulus created by packing adapter 3 and the bore 24 of the pump fluid end 22. The bore 24 is in communication with a packing lubrication supply that is operable to the same annulus in an unobstructed fashion.

Figure 11:
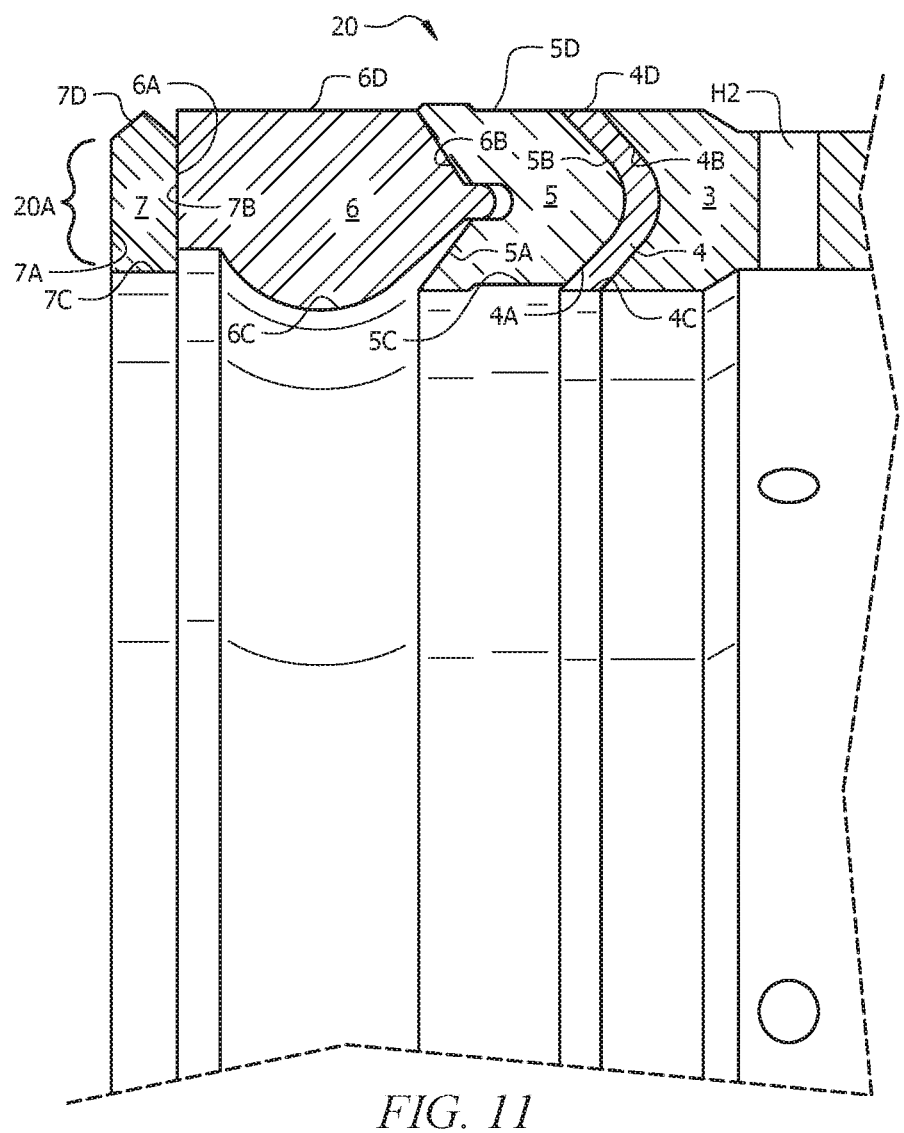
FIG. 11 is a close-up cross section view of a portion of the packing stack of FIG. 8.

As depicted in FIG. 8, a packing stack 20 of this disclosure can further comprise a backup ring 4. Backup ring 4 can be configured to bridge a gap between packing adapter inside surface 3C and the reciprocating element 18 in order to prevent the packing 5 from extruding through this small gap. With reference now to FIG. 11, which is a close-up cross section view of a front portion of the packing stack 20 of FIG. 8, backup ring 4 is cylindrical, and has a backup ring front surface 4A, a backup ring back surface 4B, a backup ring inside surface 4C, and a backup ring outside surface 4D. In the assembled configuration of packing stack 20, the backup ring back surface 4B can be adjacent to the packing adapter front surface 3A of packing adapter 3, and backup ring front surface 4A can be adjacent a packing back surface 5B.

As noted hereinabove, backup ring back surface 4B can be complementarily shaped to packing adapter front surface 3A. Backup ring front surface 4A can be complementarily shaped to a packing back surface 5B of packing 5. Backup ring inside surface 4C and backup ring outside surface 4D can be substantially parallel with central axis 17A of packing stack 20.

Backup ring 4 can be made of a material selected from brass, bronze, or peek or a combination thereof. In applications, one or more components of packing stack 20 described with reference to FIG. 8 are absent. For example, in embodiments, packing stack 20 does not comprise a backup ring 4.

Packing stack 20 comprises a packing 5. Packing 5 can be cylindrical, and have a packing front surface 5A, a packing back surface 5B, a packing inside surface 5C, and a packing outside surface 5D. In the assembled configuration of packing stack 20, the packing back surface 5B can be adjacent to the backup ring front surface 4A, and the packing front surface 5A can be adjacent to a header ring back surface 6B.

As noted hereinabove, backup ring front surface 4A can be complementarily shaped to packing back surface 5B. Packing front surface 5A can be complementarily shaped to a header ring back surface 6B of header ring 6. Packing inside surface 5C and packing outside surface 5D can be substantially parallel with central axis 17A of packing stack 20.

Packing 5 can be made of a material selected from an elastomer, polyester, rubber, fiber, or a combination thereof.

Packing stack 20 can further comprise a header ring 6. Header ring 6 can be configured to complement the packing 5 and improve the life of the combination of the two relative to embodiments absent header ring 6. Header ring 6 can be cylindrical, and have a header ring front surface 6A, a header ring back surface 6B, a header ring inside surface 6C, and a header ring outside surface 6D. In the assembled configuration of packing stack 20, the header ring back surface 6B can be adjacent to the packing front surface 5A, and the header ring front surface 6A can be adjacent to a header ring adapter back surface 7B of a header ring adapter 7.

As noted hereinabove, header ring back surface 6B can be complementarily shaped to packing front surface 5A. Header ring front surface 6A can be complementarily shaped to header ring adapter back surface 7B of header ring adapter 7. Header ring outside surface 6D can be substantially parallel with central axis 17A of packing stack 20. Header ring inside surface 6C can have a concave cross section, as depicted in FIG. 8 and FIG. 11.

Header ring 6 can be made of a material selected from urethane, nitrile rubber (i.e., Buna-N), natural rubber, aramid fibers, or Kevlar, or a combination thereof.

The packing stack 20 can further comprise a header ring adapter 7 (also referred to as a "junk ring" 7). Header ring adapter 7 can be configured to complement header ring 6. Header ring adapter 7 can be cylindrical, and have a header ring adapter front surface 7A, a header ring adapter back surface 7B, a header ring adapter inside surface 7C, and a header ring adapter outside surface 7D. In the assembled configuration of packing stack 20, the header ring adapter back surface 7B can be adjacent to the header ring front surface 6A.

As noted hereinabove, header ring adapter back surface 7B can be complementarily shaped to header ring front surface 6A. Header ring adapter front surface 7A can be substantially perpendicular to central axis 17A of packing stack 20, in embodiments. Header ring outside surface 7D can be non-linear, e.g., chevron shaped, as depicted in FIG. 8 and FIG. 11. In embodiments, header ring inside surface 7C can be substantially linear and parallel to central axis 17A of packing stack 20, as depicted in FIG. 8 and FIG. 11.

Header ring adapter 7 can be made of a material selected from brass, bronze, polyether ether ketone (PEEK), other metals or polymers (e.g., that will withstand extrusion forces), or a combination thereof.

Although depicted in and described with reference to FIGS. 8-11 as having specific shapes, the components of packing stack 20 can have can other shapes, which other shapes are within the scope of this disclosure. Generally, bearing retainer 1 is shaped such that inside surface 1C thereof provides first cavity C1 that has a complementary shape to bearing 2, second cavity C2 that has a complementary shape to packing lube seal 9, outside surface 1D that provides groove(s) G1 shaped to contain insertion component, such as o-ring 19, and hole H1 that extends from outside surface 1D to inside surface 1C of bearing retainer 1. When bearing retainer 1 and packing adapter 3 are disparate components (such as depicted in FIG. 8, FIG. 9, FIG. 10A, and FIG. 13) front surface 1A of bearing retainer 1 generally has a shape that is complementary to packing adapter back surface 3B of packing adapter 3. Alternatively, bearing retainer 1 and packing adapter 3 comprise single unitary piece 13, as depicted in FIG. 10B, and unitary piece 13 provides first cavity C1, second cavity C2, hole(s) H1, groove(s) G1, and hole(s) H2. When bearing retainer 1 and packing adapter 3 are disparate components (such as depicted in FIG. 8, FIG. 9, FIG. 10A, and FIG. 13), packing adapter 3 is shaped such that packing adapter back surface 3B is complementary to bearing retainer front surface 1A and/or bearing front surface 2A. Packing adapter front surface 3A (or unitary piece front surface 13A) is generally complementarily shaped to the shape of backup ring back surface 4B. Backup ring front surface 4A is generally complementarily shaped to the shape of packing back surface 5B. Packing front surface 5A is generally complementarily shaped with the shape of header ring back surface 6B. Header ring front surface 6A is generally complementarily shaped with the shape of header ring adapter back surface 7B. The complementary shapes of the front and back surfaces of adjacent components of packing stack 20 provide for leak prevention from inside 20C of packing stack 20 to outside 20D of the packing stack 20 when the facing surfaces of adjacent components are in contact.

Figure 12:
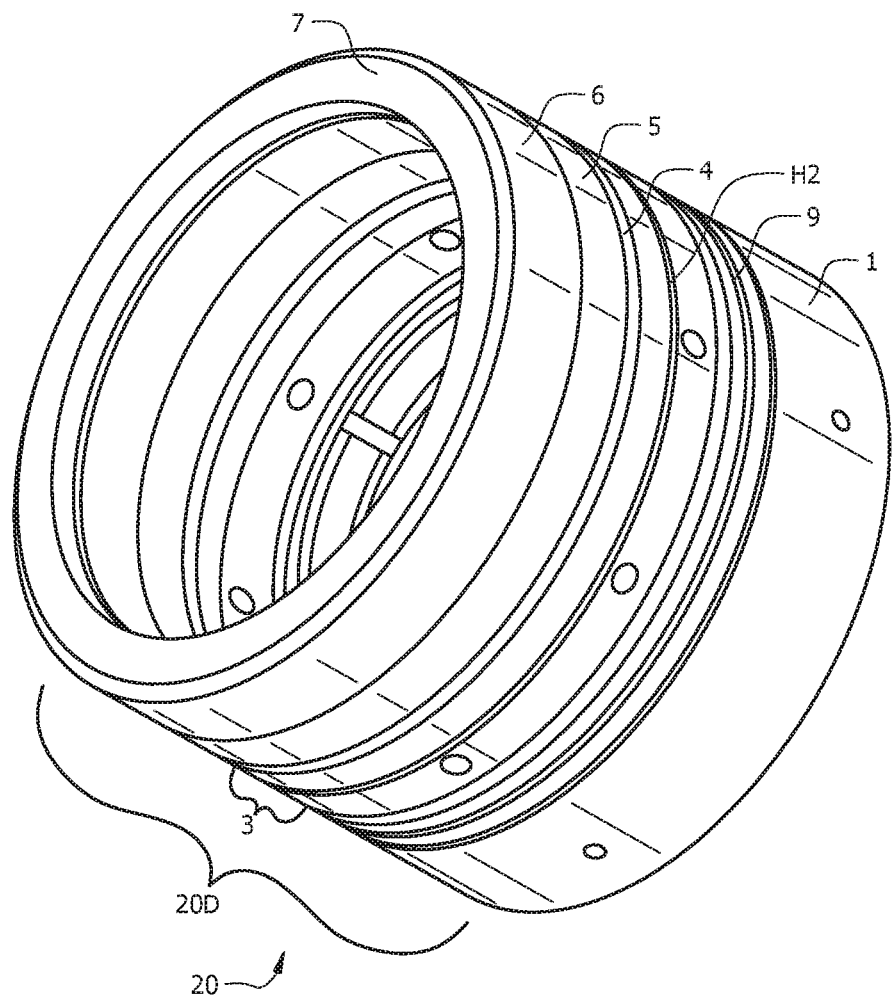
FIG. 12 is an isometric view of the packing stack of FIG. 8.

FIG. 12 is an isometric view of the packing stack of FIG. 8. As seen in FIG. 12, outside surface 20D of packing stack 20 can be substantially parallel with central axis 17A of packing stack 20 and can have a substantially uniform diameter, except along groove(s) G1, central section 3E of packing adapter 3, and header ring adapter outside surface 7D. Similarly, inside surface 20C of packing stack 20 can be substantially parallel with central axis 17A of packing stack 20 and can have a substantially uniform diameter, except along central section 3E of packing adapter 3 and inside surface 6C of header ring 6. Other shapes, combinations, and/or arrangements of components are possible for a packing stack 20 of this disclosure, so long as the packing stack 20 comprises one or more packings 5 as described herein.

Also disclosed herein is a pump fluid end 22 comprising the packing system 90 of this disclosure. For example, with reference to FIG. 13, which is a schematic cross section view of a pump fluid end 22 comprising a packing system 90 of this disclosure, pump fluid end 22 comprises: reciprocating element 18 at least partially within reciprocating element bore 24 of the pump fluid end 22, wherein the reciprocating element bore 24 extends from terminus 24A thereof into the pump fluid end 22 from an end (e.g., back end S2) of the pump fluid end 22 and has a central axis 17; suction valve 56; discharge valve 72; and packing system 90. The packing system 90 comprises a packing 5, one or more springs 80, and a terminal component 15 sealing the terminus 24A of the reciprocating element bore 24. The packing 5 is cylindrical and compressible and positioned within and fills a void volume 81 in reciprocating element bore 24 of the pump fluid end 22. As described hereinabove, the one or more springs 80 can be positioned between the terminal component 15 and the packing 5/packing stack 20 (or elsewhere within or adjacent a terminal component of packing stack 20) to provide a sufficient force on the packing 5/packing stack 20 to maintain compression of the packing 5 within the void volume 81. The one or more springs 80 can comprise a helical spring, a frusto-conical spring, or a combination thereof. In embodiments, the one or more springs 80 comprise a Belleville spring or a plurality of Bellville springs, wherein the plurality of Belleville springs are arranged in series, in parallel, or a combination thereof (i.e., in series-parallel).

Figure 13:
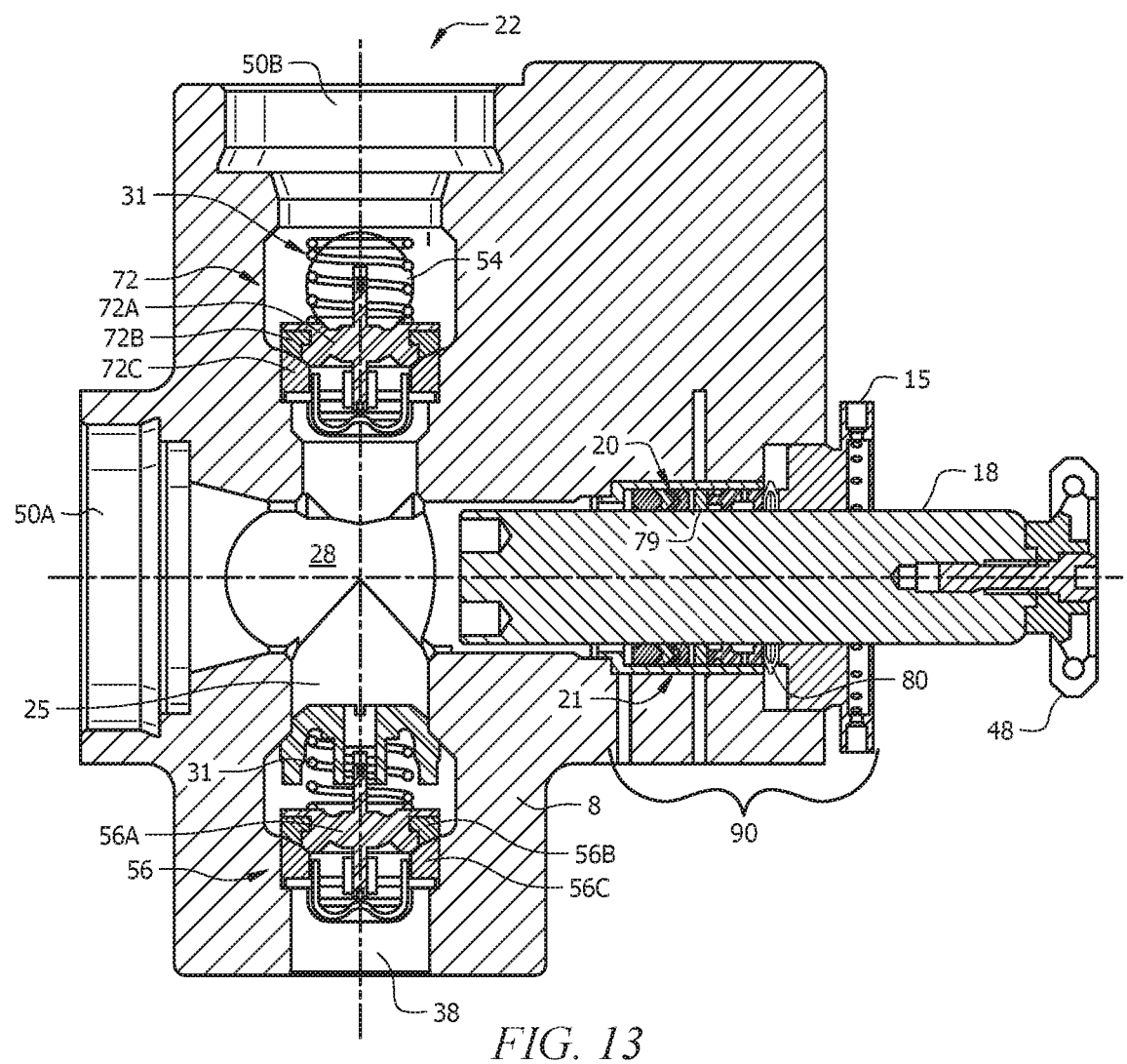
FIG. 13 is a schematic cross section view of a pump fluid end comprising a packing stack of this disclosure.

The pump fluid end 22 of this disclosure can be a concentric bore pump fluid end, as described with reference to FIG. 3 hereinabove, or a cross bore pump fluid end, such as a x-bore pump fluid end 22 described hereinabove with reference to FIG. 2A or a tee-bore pump fluid end 22 described hereinabove with reference to FIG. 2B. In the embodiment of FIG. 13, suction valve assembly 56 comprises suction valve body 56A, suction valve insert 56B, suction valve seat 56C, and spring 31; discharge valve assembly 72 comprises discharge valve body 72A, discharge valve insert 72B, discharge valve seat 72C, and spring 31. As noted above, other valve types and arrangements can be utilized in a pump fluid end 22 of this disclosure.

As described hereinabove, the packing stack 20 can further comprise: a packing carrier 20", wherein the packing carrier 20" is cylindrical and has an inside surface 20"C, an outside surface 20"D, a front surface 20"A, and a back surface 20"B; an o-ring in a groove G1 in the packing carrier outside surface 20"D; a packing lube seal 9 in contact with the packing carrier inside surface 20"C of the packing carrier 20" and in fluid communication with a hole H1 extending from the packing carrier outside surface 20"D to the packing carrier inside surface 20"C; a backup ring 4, wherein the backup ring 4 is cylindrical, wherein the backup ring 4 has a backup ring front surface 4A and a backup ring back surface 4B, wherein, in an assembled configuration of the packing stack 20, the backup ring back surface 4B is adjacent the packing carrier front surface 20"A, and the backup ring front surface 4A is adjacent a packing back surface 5B of the packing 5; a header ring 6, wherein the header ring 6 is cylindrical, wherein the header ring 6 has a header ring front surface 6A and a header ring back surface 6B, and wherein the header ring back surface 6B is adjacent a packing front end 5A of the packing 5; and/or a header ring adapter 7, wherein the header ring adapter 7 has a header ring adapter front surface 7A and a header ring adapter back surface 7B, and where, in the assembled configuration, the header ring adapter back surface 7B is adjacent the header ring front surface 6A. The packing carrier 20" can comprise a seal adapter 20' and a packing adapter 3, wherein the seal adapter 20' comprises a bearing retainer 1 and a bearing 2, wherein the bearing retainer 1 is cylindrical, and has a bearing retainer inside surface 1C and a bearing retainer outside surface 1D, and wherein the bearing retainer 1 comprises a (e.g., first) cavity C1 along the bearing retainer inside surface 1C, and wherein the bearing 2 is cylindrical, wherein the bearing 2 has a bearing outside surface 2D, a bearing inside surface 2C, a bearing front surface 2A and a bearing back surface 2B, and wherein, when the packing stack 20 is assembled, the bearing 2 is at least partially within the (e.g., first) cavity C1, such that the bearing outside surface 2D and the bearing back surface 2B are in contact with the bearing retainer inside surface 1C; and wherein the packing adapter 3 is cylindrical, wherein the packing adapter 3 has a packing adapter inside surface 3C, a packing adapter outside surface 3D, and a packing adapter front surface 3A, and wherein the packing adapter front surface 3A of the packing adapter 3 has a non-linear cross section. The packing adapter 3 and the bearing retainer 1 can be integrated as a single, unitary piece 13; or the packing adapter 3 and the bearing retainer 1 can be disparate components, wherein the bearing retainer 1 further has a bearing retainer front surface 1A and a bearing retainer back surface 1B, wherein the packing adapter 3 further comprises a packing adapter back surface 3B, and wherein, in the assembled configuration of the packing stack 20, the bearing front surface 2A is axially aligned along a central axis 17A of the packing stack 20 with the bearing retainer front surface 2A, and wherein the packing adapter back surface 3B abuts the bearing retainer front surface 1A. The packing stack 20 is disposed within the reciprocating element bore 24 such that the central axis 17A of the packing stack 20 is coaxial with the central axis 17 of the reciprocating element bore 24, and the bearing retainer back surface 1B is proximate the back S2 of the pump fluid end 22. A packing sleeve 21 can be positioned within the pump fluid end body about the outside surface 20D of the packing stack 20. Packing sleeve 21 can surround outside surface 20D of the packing stack 20. A packing screw 15 can be configured to hold packing stack 20 inside back end S2 of pump fluid end 22. Packing screw 15 can secure (e.g., via threading) the packing stack 20 within the pump fluid end body 8 of the pump fluid end 22.

In FIG. 13, pump fluid end 22 is a cross bore pump fluid end 22. A pump fluid end 22 of this disclosure can be a concentric bore pump fluid end 22 (e.g., a concentric bore pump fluid end 22, as described hereinabove with reference to FIG. 3) or a cross bore (e.g., an x-bore pump fluid end 22, as described hereinabove with reference to FIG. 2A or a T-bore pump fluid end 22, as described with reference to FIG. 2B) pump fluid end 22.

Also disclosed herein is a pump 10 comprising a pump fluid end 22 of this disclosure comprising the packing system 90 as described herein. The pump 10 comprises: the pump fluid end 22 of this disclosure comprising packing system 90; and a pump power end 12, wherein the pump power end 12 is operable to reciprocate the reciprocating element 18 within the reciprocating element bore 24 of the pump fluid end 22. The pump fluid end 22 can be a concentric bore pump fluid end 22; or a cross-bore pump fluid end 22.

Figure 14:
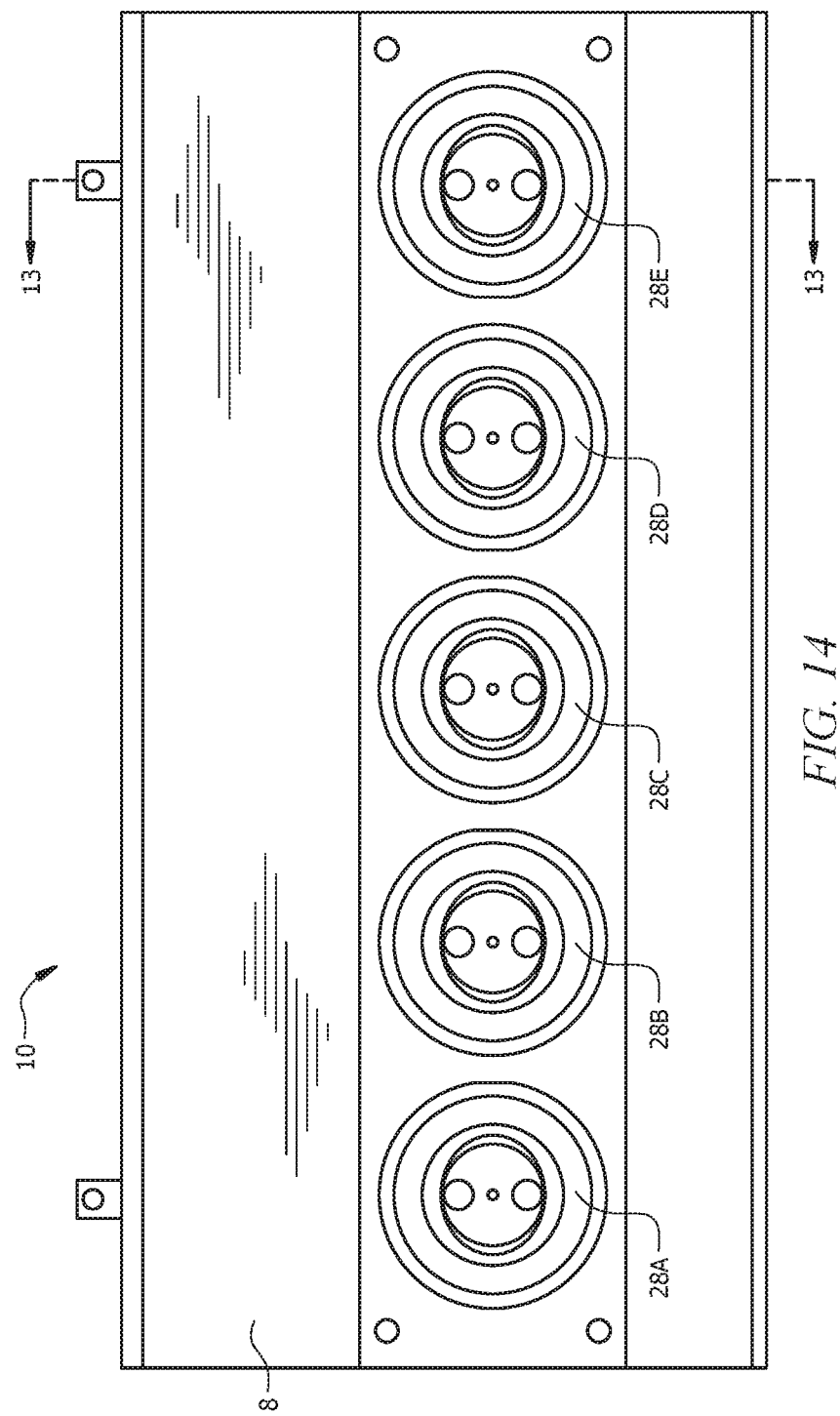
FIG. 14 is a schematic of a pump comprising a pump fluid end of this disclosure.

A pump 10 of this disclosure can be a multiplex pump comprising a plurality of reciprocating assemblies (e.g., reciprocating elements 18, and a corresponding plurality of reciprocating element bores 24, suction valve assemblies 56, and discharge valve assemblies 72). The plurality can comprise any number such as, for example, 2, 3, 4, 5, 6, 7, or more. For example, in embodiments, pump 10 is a triplex pump, wherein the plurality comprises three. In alternative embodiments, pump 10 comprises a Quintuplex pump, wherein the plurality comprises five. For example, FIG. 14 is a schematic of a Quintuplex pump 10 comprising a pump fluid end 22 having five chambers 28 (e.g., first chamber 28A, second chamber 28B, third chamber 28C, fourth chamber 28D, and fifth chamber 28E). A cross section view taken along line A-A of FIG. 14 can be a pump fluid end 22 as depicted in FIG. 13, or can be a concentric bore pump fluid end 22 as depicted in FIG. 3 or a tee-bore pump fluid end 22 as depicted in FIG. 2B, so long as the pump fluid end 22 comprises a packing system 90 of this disclosure.

Figure 15:
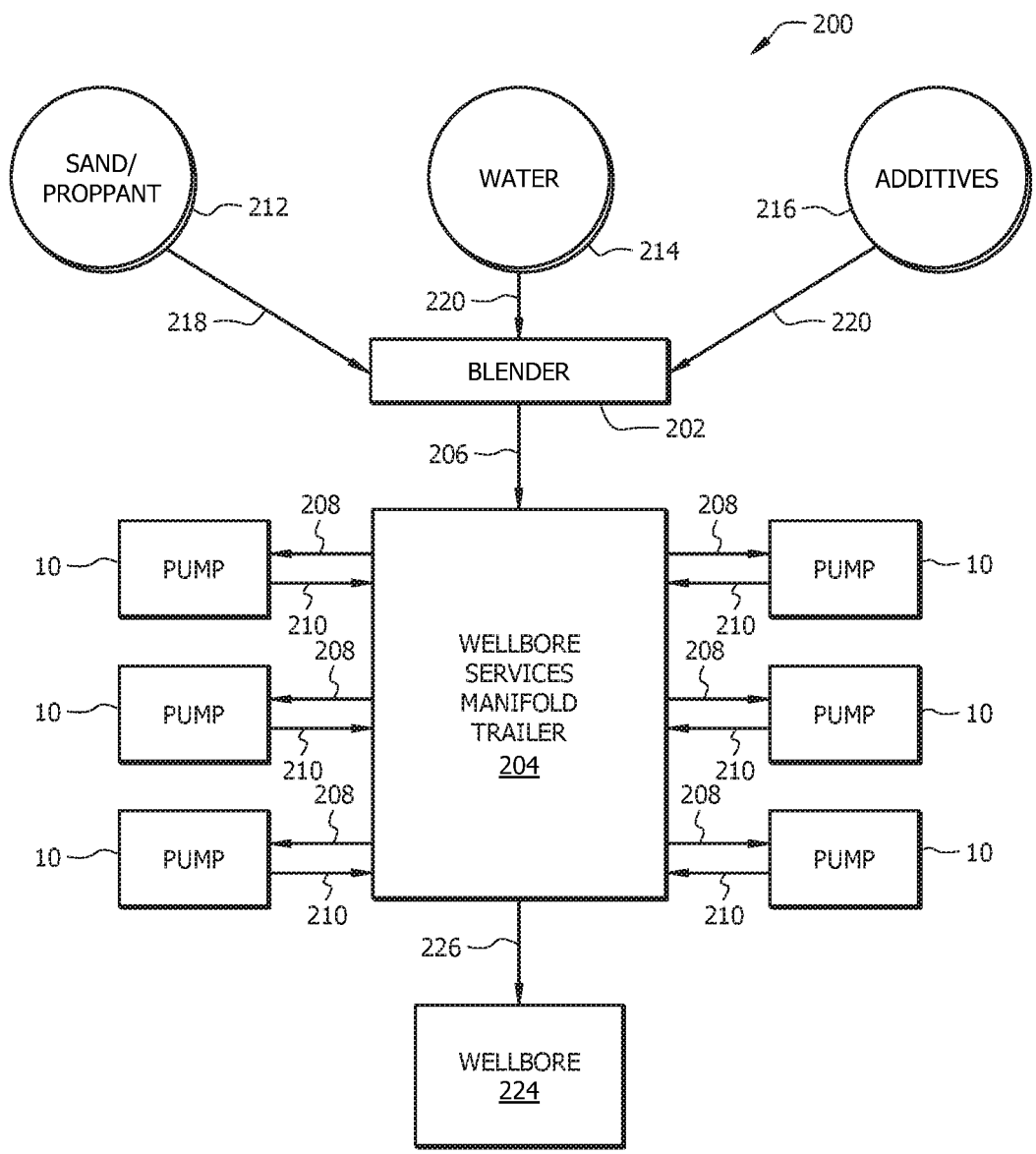
FIG. 15 is a schematic representation of an embodiment of a wellbore servicing system, according to embodiments of this disclosure.

Also disclosed herein are a method of servicing a wellbore and a wellbore servicing system 200 comprising a pump of this disclosure. An embodiment of a wellbore servicing system 200 and a method of servicing a wellbore via the wellbore servicing system 200 will now be described with reference to FIG. 15, which is a schematic representation of an embodiment of a wellbore servicing system 200, according to embodiments of this disclosure.

A method of servicing a wellbore 224 according to this disclosure comprises: fluidly coupling a pump 10 to a source of a wellbore servicing fluid and to the wellbore 224; and communicating wellbore servicing fluid into a formation in fluid communication with the wellbore 224 via the pump 10. As detailed further hereinabove, the pump 10 of this disclosure comprises a pump fluid end 12 and a pump power end 22. The pump power end 12 is operable to reciprocate reciprocating element 18 within reciprocating element bore 24 of pump fluid end 22. The pump fluid end 22 comprises: reciprocating element 18 at least partially within reciprocating element bore 24 of the pump fluid end 22, wherein the reciprocating element bore 24 extends from a terminus 24A thereof into the pump fluid end 22 from an end (e.g., back end S2) of the pump fluid end 22 and has a central axis 17; a suction valve assembly 56; and a discharge valve assembly 72, and a packing system 90 of this disclosure. As detailed hereinabove, the packing system 90 comprises: a packing stack 20 comprising a packing 5, wherein the packing 5 is cylindrical and compressible and positioned within and substantially filling a void volume 81 in the reciprocating element bore 24 of the pump 10; one or more springs 80; and a terminal component 15 sealing a terminus 24A of the reciprocating element bore 24. The one or more springs 80 can be positioned between the terminal component 15 and the packing 5 (or elsewhere within or adjacent the packing stack 20) to provide a sufficient force on the packing 5 to maintain compression of the packing 5 within the void volume 81. The one or more springs 80 can comprise a helical spring, a frusto-conical spring, or a combination thereof. By way of example, the one or more springs 80 can comprise a Belleville spring, or a plurality of Bellville springs, wherein the plurality of Belleville springs are arranged in series, in parallel, or a combination thereof (i.e., in series-parallel).

The method can further comprise selecting a number, a plate thickness, an initial deformation, and/or an arrangement of the one or more springs 80 such that the one or more springs 80 can expand an axial distance in a direction parallel to the central axis 17 while maintaining the sufficient force on the packing 5 to maintain compression of the packing 5 within the void volume 81. The axial distance can be at least 0.05, 0.06, 0.07, 0.08, 0.09, or 0.1 inch (1.3, 1.5, 1.8, 2.0, 2.3, or 2.5 mm). The force exerted on the packing 5/packing stack 20 by the one or more springs 80 can increase as the one or more springs 80 expand in an axial direction parallel to the central axis 17 of the reciprocating element bore 24.

As described hereinabove, the packing stack 20 can comprise a packing carrier 20", wherein the packing carrier 20" comprises a seal adapter 20' and a packing adapter 3, wherein the seal adapter 20' comprises a bearing retainer 1 and a bearing 2. The bearing retainer 1 can be cylindrical and have a bearing retainer inside surface 1C and a bearing retainer outside surface 1D, and comprise a first cavity C1 along the bearing retainer inside surface 1C. The bearing 2 can be cylindrical, and have a bearing outside surface 2D, a bearing inside surface 2C, a bearing front surface 2A, and a bearing back surface 2B. In an assembled configuration of the packing stack 20, the bearing 2 can be at least partially within the first cavity C1, such that the bearing outside surface 2D and the bearing back surface 2B are in contact with the bearing retainer inside surface 1C. The packing adapter 3 can be cylindrical, and have a packing adapter inside surface 1C, a packing adapter outside surface 1D, and a packing adapter front surface 1A. The front surface 1A of the packing adapter 1 can have a non-linear cross section. The packing adapter 3 and the bearing retainer 1 can be integrated as a single, unitary piece 13; or the packing adapter 3 and the bearing retainer 1 can be disparate components, wherein the bearing retainer 1 further has a bearing retainer front surface 1A and a bearing retainer back surface 1B, the packing adapter 3 further comprises a packing adapter back surface 3B, and, in the assembled configuration of the packing stack 20, the bearing front surface 2A is axially aligned along a central axis 17A of the packing stack 20 with the bearing retainer front surface 1A, and the packing adapter back surface 3B abuts the bearing retainer front surface 1A.

It will be appreciated that the wellbore servicing system 200 disclosed herein can be used for any purpose. In embodiments, the wellbore servicing system 200 may be used to service a wellbore 224 that penetrates a subterranean formation by pumping a wellbore servicing fluid into the wellbore and/or subterranean formation. As used herein, a "wellbore servicing fluid" or "servicing fluid" refers to a fluid used to drill, complete, work over, fracture, repair, or in any way prepare a well bore for the recovery of materials residing in a subterranean formation penetrated by the well bore. It is to be understood that "subterranean formation" encompasses both areas below exposed earth and areas below earth covered by water such as ocean or fresh water. Examples of servicing fluids suitable for use as the wellbore servicing fluid, the another wellbore servicing fluid, or both include, but are not limited to, cementitious fluids (e.g., cement slurries), drilling fluids or muds, spacer fluids, fracturing fluids or completion fluids, and gravel pack fluids, remedial fluids, perforating fluids, diverter fluids, sealants, drilling fluids, completion fluids, gelation fluids, polymeric fluids, aqueous fluids, oleaginous fluids, etc.

In embodiments, the wellbore servicing system 200 comprises one or more pumps 10 operable to perform oilfield and/or well servicing operations. Such operations may include, but are not limited to, drilling operations, fracturing operations, perforating operations, fluid loss operations, primary cementing operations, secondary or remedial cementing operations, or any combination of operations thereof. Although a wellbore servicing system is illustrated, skilled artisans will readily appreciate that the pump 10 disclosed herein may be employed in any suitable operation.

In embodiments, the wellbore servicing system 200 may be a system such as a fracturing spread for fracturing wells in a hydrocarbon-containing reservoir. In fracturing operations, wellbore servicing fluids, such as particle laden fluids, are pumped at high-pressure into a wellbore. The particle laden fluids may then be introduced into a portion of a subterranean formation at a sufficient pressure and velocity to cut a casing and/or create perforation tunnels and fractures within the subterranean formation. Proppants, such as grains of sand, are mixed with the wellbore servicing fluid to keep the fractures open so that hydrocarbons may be produced from the subterranean formation and flow into the wellbore. Hydraulic fracturing may desirably create high-conductivity fluid communication between the wellbore and the subterranean formation.

The wellbore servicing system 200 comprises a blender 202 that is coupled to a wellbore services manifold trailer 204 via flowline 206. As used herein, the term "wellbore services manifold trailer" includes a truck and/or trailer comprising one or more manifolds for receiving, organizing, and/or distributing wellbore servicing fluids during wellbore servicing operations. In this embodiment, the wellbore services manifold trailer 204 is coupled to six positive displacement pumps (e.g., such as pump 10 that may be mounted to a trailer and transported to the wellsite via a semi-tractor) via outlet flowlines 208 and inlet flowlines 210. In alternative embodiments, however, there may be more or less pumps used in a wellbore servicing operation. Outlet flowlines 208 are outlet lines from the wellbore services manifold trailer 204 that supply fluid to the pumps 10. Inlet flowlines 210 are inlet lines from the pumps 10 that supply fluid to the wellbore services manifold trailer 204.

The blender 202 mixes solid and fluid components to achieve a well-blended wellbore servicing fluid. As depicted, sand or proppant 212, water 214, and additives 216 are fed into the blender 202 via feedlines 218, 220, and 212, respectively. The water 214 may be potable, non-potable, untreated, partially treated, or treated water. In embodiments, the water 214 may be produced water that has been extracted from the wellbore while producing hydrocarbons form the wellbore. The produced water may comprise dissolved and/or entrained organic materials, salts, minerals, paraffins, aromatics, resins, asphaltenes, and/or other natural or synthetic constituents that are displaced from a hydrocarbon formation during the production of the hydrocarbons. In embodiments, the water 214 may be flowback water that has previously been introduced into the wellbore during wellbore servicing operation. The flowback water may comprise some hydrocarbons, gelling agents, friction reducers, surfactants and/or remnants of wellbore servicing fluids previously introduced into the wellbore during wellbore servicing operations.

The water 214 may further comprise local surface water contained in natural and/or manmade water features (such as ditches, ponds, rivers, lakes, oceans, etc.). Still further, the water 214 may comprise water stored in local or remote containers. The water 214 may be water that originated from near the wellbore and/or may be water that has been transported to an area near the wellbore from any distance. In some embodiments, the water 214 may comprise any combination of produced water, flowback water, local surface water, and/or container stored water. In some implementations, water may be substituted by nitrogen or carbon dioxide; some in a foaming condition.

In embodiments, the blender 202 may be an Advanced Dry Polymer (ADP) blender and the additives 216 are dry blended and dry fed into the blender 202. In alternative embodiments, however, additives may be pre-blended with water using other suitable blenders, such as, but not limited to, a GEL PRO blender, which is a commercially available preblender trailer from Halliburton Energy Services, Inc., to form a liquid gel concentrate that may be fed into the blender 202. The mixing conditions of the blender 202, including time period, agitation method, pressure, and temperature of the blender 202, may be chosen by one of ordinary skill in the art with the aid of this disclosure to produce a homogeneous blend having a desirable composition, density, and viscosity. In alternative embodiments, however, sand or proppant, water, and additives may be premixed and/or stored in a storage tank before entering a wellbore services manifold trailer 204.

In embodiments, the pump(s) 10 (e.g., pump(s) 10 and/or maintained pump(s) 10) pressurize the wellbore servicing fluid to a pressure suitable for delivery into a wellbore 224 or wellhead. For example, the pumps 10 may increase the pressure of the wellbore servicing fluid (e.g., the wellbore servicing fluid and/or the another wellbore servicing fluid) to a pressure of greater than or equal to about 3,000 psi, 5,000 psi, 10,000 psi, 20,000 psi, 30,000 psi, 40,000 psi, or 50,000 psi, or higher.

From the pumps 10, the wellbore servicing fluid may reenter the wellbore services manifold trailer 204 via inlet flowlines 210 and be combined so that the wellbore servicing fluid may have a total fluid flow rate that exits from the wellbore services manifold trailer 204 through flowline 226 to the flow connector wellbore 1128 of between about 1 BPM to about 200 BPM, alternatively from between about 50 BPM to about 150 BPM, alternatively about 100 BPM. In embodiments, each of one or more pumps 10 discharge wellbore servicing fluid at a fluid flow rate of between about 1 BPM to about 200 BPM, alternatively from between about 50 BPM to about 150 BPM, alternatively about 100 BPM. In embodiments, each of one or more pumps 10 discharge wellbore servicing fluid at a volumetric flow rate of greater than or equal to about 3, 10, or 20 barrels per minute (BPM), or in a range of from about 3 to about 20, from about 10 to about 20, or from about 5 to about 20 BPM.

Persons of ordinary skill in the art with the aid of this disclosure will appreciate that the flowlines described herein are piping that are connected together for example via flanges, collars, welds, etc. These flowlines may include various configurations of pipe tees, elbows, and the like. These flowlines connect together the various wellbore servicing fluid process equipment described herein.

Also disclosed herein are methods for servicing a wellbore (e.g., wellbore 224). Without limitation, servicing the wellbore may include: positioning the wellbore servicing composition in the wellbore 224 (e.g., via one or more pumps 10 as described herein) to isolate the subterranean formation from a portion of the wellbore; to support a conduit in the wellbore; to plug a void or crack in the conduit; to plug a void or crack in a cement sheath disposed in an annulus of the wellbore; to plug a perforation; to plug an opening between the cement sheath and the conduit; to prevent the loss of aqueous or nonaqueous drilling fluids into loss circulation zones such as a void, vugular zone, or fracture; to plug a well for abandonment purposes; to divert treatment fluids; and/or to seal an annulus between the wellbore and an expandable pipe or pipe string. In other embodiments, the wellbore servicing systems and methods may be employed in well completion operations such as primary and secondary cementing operation to isolate the subterranean formation from a different portion of the wellbore.

In embodiments, a wellbore servicing method may comprise transporting a positive displacement pump (e.g., pump 10) to a site for performing a servicing operation. Additionally or alternatively, one or more pumps may be situated on a suitable structural support. Non-limiting examples of a suitable structural support or supports include a trailer, truck, skid, barge or combinations thereof. In embodiments, a motor or other power source for a pump may be situated on a common structural support.

In embodiments, a wellbore servicing method may comprise providing a source for a wellbore servicing fluid. As described above, the wellbore servicing fluid may comprise any suitable fluid or combinations of fluid as may be appropriate based upon the servicing operation being performed. Non-limiting examples of suitable wellbore servicing fluid include a fracturing fluid (e.g., a particle laden fluid, as described herein), a perforating fluid, a cementitious fluid, a sealant, a remedial fluid, a drilling fluid (e.g., mud), a spacer fluid, a gelation fluid, a polymeric fluid, an aqueous fluid, an oleaginous fluid, an emulsion, various other wellbore servicing fluid as will be appreciated by one of skill in the art with the aid of this disclosure, and combinations thereof. The wellbore servicing fluid may be prepared on-site (e.g., via the operation of one or more blenders) or, alternatively, transported to the site of the servicing operation.

In embodiments, a wellbore servicing method may comprise fluidly coupling a pump 10 to the wellbore servicing fluid source. As such, wellbore servicing fluid may be drawn into and emitted from the pump 10. Additionally or alternatively, a portion of a wellbore servicing fluid placed in a wellbore 224 may be recycled, i.e., mixed with the water stream obtained from a water source and treated in fluid treatment system. Furthermore, a wellbore servicing method may comprise conveying the wellbore servicing fluid from its source to the wellbore via the operation of the pump 10 disclosed herein.

In alternative embodiments, the reciprocating apparatus may comprise a compressor. In embodiments, a compressor similar to the pump 10 may comprise at least one each of a cylinder, plunger, connecting rod, crankshaft, and housing, and may be coupled to a motor. In embodiments, such a compressor may be similar in form to a pump and may be configured to compress a compressible fluid (e.g., a gas) and thereby increase the pressure of the compressible fluid. For example, a compressor may be configured to direct the discharge therefrom to a chamber or vessel that collects the compressible fluid from the discharge of the compressor until a predetermined pressure is built up in the chamber. Generally, a pressure sensing device may be arranged and configured to monitor the pressure as it builds up in the chamber and to interact with the compressor when a predetermined pressure is reached. At that point, the compressor may either be shut off, or alternatively the discharge may be directed to another chamber for continued operation.

In embodiments, a reciprocating apparatus comprises an internal combustion engine, hereinafter referred to as an engine. Such engines are also well known, and typically include at least one each of a plunger, cylinder, connecting rod, and crankshaft. The arrangement of these components is substantially the same in an engine and a pump (e.g. pump 10). A reciprocating element 18 such as a plunger may be similarly arranged to move in reciprocating fashion within the cylinder. Skilled artisans will appreciate that operation of an engine may somewhat differ from that of a pump. In a pump, rotational power is generally applied to a crankshaft acting on the plunger via the connecting rod, whereas in an engine, rotational power generally results from a force (e.g., an internal combustion) exerted on or against the plunger, which acts against the crankshaft via the connecting rod.

For example, in a typical 4-stroke engine, arbitrarily beginning with the exhaust stroke, the plunger is fully extended during the exhaust stroke, (e.g., minimizing the internal volume of the cylinder). The plunger may then be retracted by inertia or other forces of the engine componentry during the intake stroke. As the plunger retracts within the cylinder, the internal volume of cylinder increases, creating a low pressure within the cylinder into which an air/fuel mixture is drawn. When the plunger is fully retracted within the cylinder, the intake stroke is complete, and the cylinder is substantially filled with the air/fuel mixture. As the crankshaft continues to rotate, the plunger may then be extended, during the compression stroke, into the cylinder compressing the air-fuel mixture within the cylinder to a higher pressure.

A spark plug may be provided to ignite the fuel at a predetermined point in the compression stroke. This ignition increases the temperature and pressure within the cylinder substantially and rapidly. In a diesel engine, however, the spark plug may be omitted, as the heat of compression derived from the high compression ratios associated with diesel engines suffices to provide spontaneous combustion of the air-fuel mixture. In either case, the heat and pressure act forcibly against the plunger and cause it to retract back into the cylinder during the power cycle at a substantial force, which may then be exerted on the connecting rod, and thereby on to the crankshaft.

Those of ordinary skill in the art will readily appreciate various benefits that may be realized by the present disclosure. In oil well high pressure stimulation pumps 10, slurries containing highly erosive material are frequently being pressurized/delivered at high rates. The reciprocating elements (e.g., plungers) 18, reciprocating rapidly back and forth carry a small amount of such fluids into the seal areas as these fluids are attached to the outside walls of the reciprocating element(s) 18. As the fluid (e.g., liquids, foams (with gases), or liquefied gases) leaks into the seals area while carrying such abrasive materials, it can abrade the reciprocating element 18 and packing 5 such that the outside diameter of the reciprocating element 18 becomes smaller, and/or the inside diameter of the packing 5 becomes larger. Since the packing 5 is typically compressed by a compression nut or the like, the packing 5 maintains contact with the reciprocating element 18, until the elastic limits are challenged by the expansion, at which time the packing 5 becomes ineffective. This issue is conventionally addressed by tightening the compression nut. While tightening of the compression nut can be relatively easy, it is not desirable, as leaks can occur during the tightening, thus causing disruptions in operation of pump 10. According to this disclosure, a simple spring 80 is utilized in a packing system 90 to automatically compensate for such volumetric changes, without operational interruptions such as for tightening of a compression nut.

The herein disclosed packing system 90 can improve operational life of the pump 10, thus reducing costs, and improving reliability and service quality provided by the pump 10 containing the packing system 90 disclosed herein. By utilizing one or more springs 80 for compressing the packing(s) 5, the packing(s) can exhibit an extended life before the need for replacement thereof, thus reducing requirements for (e.g., the frequency of) interventions, and also potentially concomitantly reducing operating costs.

ADDITIONAL DISCLOSURE

The following are non-limiting, specific embodiments in accordance with the present disclosure:

In a first embodiment, a packing system for a pump comprises: a packing stack comprising a packing, wherein the packing is cylindrical and compressible such that the packing can fill a void volume in a reciprocating element bore of the pump; one or more springs; and a terminal component configured for sealing a terminus of the reciprocating element bore, wherein the one or more springs are positioned between the terminal component and the packing to provide a force on the packing that maintains compression of the packing within the void volume.

A second embodiment can include the packing system of the first embodiment, wherein the one or more springs comprise a helical spring, a frusto-conical spring, or a combination thereof.

A third embodiment can include the packing system of the second embodiment, wherein the one or more springs comprise a Belleville spring.

A fourth embodiment can include the packing system of the third embodiment, comprising a plurality of Bellville springs, wherein the plurality of Belleville springs are arranged in series, in parallel, or a combination thereof (i.e., in series-parallel).

A fifth embodiment can include the packing assembly of any one of the first to the fourth embodiments, wherein the one or more springs can expand an axial distance in a direction parallel to a central axis of the reciprocating element bore while maintaining the force, wherein the axial distance is at least 0.05, 0.06, 0.07, 0.08, 0.09, or 0.1 inch (1.3, 1.5, 1.8, 2.0, 2.3, or 2.5 mm).

A sixth embodiment can include the packing system of the fifth embodiment, wherein the one or more springs provide a force exerted on the packing by the one or more springs that increases as the one or more springs expand in the axial direction.

A seventh embodiment can include the packing system of any one of the first to sixth embodiments, wherein the terminal component comprises a packing screw.

An eighth embodiment can include the packing system of any one of the first to seventh embodiments, wherein the packing stack further comprises: a packing carrier, wherein the packing carrier is cylindrical and has an inside surface, an outside surface, a front surface, and a back surface; an o-ring; a packing lube seal; a backup ring, wherein the backup ring is cylindrical, and has a backup ring front surface and a backup ring back surface; a header ring, wherein the header ring is cylindrical, and wherein the header ring has a header ring front surface and a header ring back surface; and/or a header ring adapter, wherein the header ring adapter has a header ring adapter front surface and a header ring adapter back surface, wherein, when assembled: the o-ring is positioned in a groove in the outside surface of the packing carrier; the packing lube seal is in contact with the inside surface of the packing carrier and in fluid communication with a hole extending from the packing carrier outside surface to the packing carrier inside surface; the backup ring back surface is adjacent the packing carrier front surface; a packing back surface of the packing is adjacent the backup ring front surface; the header ring back surface is adjacent a packing front surface of the packing; and/or the header ring adapter back surface is adjacent the header ring front surface.

A ninth embodiment can include the packing system of the eighth embodiment, wherein the packing carrier comprises a seal adapter and a packing adapter, wherein the seal adapter comprises a bearing retainer and a bearing, wherein the bearing retainer is cylindrical, and has a bearing retainer inside surface and a bearing retainer outside surface, and wherein the bearing retainer comprises a cavity along the bearing retainer inside surface, and wherein the bearing is cylindrical, wherein the bearing has a bearing outside surface, a bearing inside surface, a bearing front surface and a bearing back surface, and wherein, when the packing stack is assembled, the bearing is at least partially within the cavity, such that the bearing outside surface and the bearing back surface are in contact with the bearing retainer inside surface; and wherein the packing adapter is cylindrical, wherein the packing adapter has a packing adapter inside surface, a packing adapter outside surface, and a packing adapter front surface, and wherein the front surface of the packing adapter has a non-linear cross section, wherein the packing adapter and the bearing retainer are integrated as a single, unitary piece; or wherein the packing adapter and the bearing retainer are disparate components, wherein the bearing retainer further has a bearing retainer front surface and a bearing retainer back surface, wherein the packing adapter further comprises a packing adapter back surface, and wherein, in the assembled configuration of the packing stack, the bearing front surface is axially aligned along a central axis of the packing stack with the bearing retainer front surface, and the packing adapter back surface abuts the bearing retainer front surface.

In a tenth embodiment, a pump fluid end comprises: a reciprocating element at least partially within a reciprocating element bore of the pump fluid end, wherein the reciprocating element bore extends from a terminus thereof into the pump fluid end from an end of the pump fluid end and has a central axis; a suction valve; a discharge valve; and a packing system comprising: a packing stack comprising a packing, wherein the packing is cylindrical and compressible and positioned within and fills a void volume in a reciprocating element bore of the pump fluid end; one or more springs; and a terminal component sealing the terminus of the reciprocating element bore, wherein the one or more springs are positioned between the terminal component and the packing to provide a sufficient force on the packing to maintain compression of the packing within the void volume.

An eleventh embodiment can include the pump fluid end of the tenth embodiment, wherein the one or more springs comprise a helical spring, a frusto-conical spring, or a combination thereof.

A twelfth embodiment can include the pump fluid end of the eleventh embodiment, wherein the one or more springs comprise a Belleville spring.

A thirteenth embodiment can include the pump fluid end of the twelfth embodiment comprising a plurality of Bellville springs, wherein the plurality of Belleville springs are arranged in series, in parallel, or a combination thereof (i.e., in series-parallel).

A fourteenth embodiment can include the pump fluid end of the thirteenth embodiment, wherein the one or more springs provide a force exerted on the packing by the one or more springs that increases as the one or more springs expand in an axial direction parallel to the central axis.

A fifteenth embodiment can include the pump fluid end of any one of the tenth to fourteenth embodiments, wherein the pump fluid end is a concentric bore pump fluid end or a cross bore pump fluid end.

A sixteenth embodiment can include the pump fluid end of any one of the tenth to fifteenth embodiments, wherein the packing stack further comprises: a packing carrier, wherein the packing carrier is cylindrical and has an inside surface, an outside surface, a front surface, and a back surface; an o-ring in a groove in the packing carrier outside surface; a packing lube seal in contact with the inside surface of the packing carrier and in fluid communication with a hole extending from the packing carrier outside surface to the packing carrier inside surface; a backup ring, wherein the backup ring is cylindrical, wherein the backup ring has a backup ring front surface and a backup ring back surface, wherein, in an assembled configuration of the packing stack, the backup ring back surface is adjacent the packing carrier front surface, and the backup ring front surface is adjacent a packing back surface of the packing; a header ring, wherein the header ring is cylindrical, wherein the header ring has a header ring front surface and a header ring back surface, and wherein the header ring back surface is adjacent a packing front end of the packing; and/or a header ring adapter, wherein the header ring adapter has a header ring adapter front surface and a header ring adapter back surface, and where, in the assembled configuration, the header ring adapter back surface is adjacent the header ring front surface.

A seventeenth embodiment can include the pump fluid end of the sixteenth embodiment, wherein the packing carrier comprises a seal adapter and a packing adapter, wherein the seal adapter comprises a bearing retainer and a bearing, wherein the bearing retainer is cylindrical, and has a bearing retainer inside surface and a bearing retainer outside surface, and wherein the bearing retainer comprises a cavity along the bearing retainer inside surface, and wherein the bearing is cylindrical, wherein the bearing has a bearing outside surface, a bearing inside surface, a bearing front surface and a bearing back surface, and wherein, when the packing stack is assembled, the bearing is at least partially within the cavity, such that the bearing outside surface and the bearing back surface are in contact with the bearing retainer inside surface; and wherein the packing adapter is cylindrical, wherein the packing adapter has a packing adapter inside surface, a packing adapter outside surface, and a packing adapter front surface, and wherein the front surface of the packing adapter has a non-linear cross section, wherein the packing adapter and the bearing retainer are integrated as a single, unitary piece; or wherein the packing adapter and the bearing retainer are disparate components, wherein the bearing retainer further has a bearing retainer front surface and a bearing retainer back surface, wherein the packing adapter further comprises a packing adapter back surface, and wherein, in the assembled configuration of the packing stack, the bearing front surface is axially aligned along a central axis of the packing stack with the bearing retainer front surface, and the packing adapter back surface abuts the bearing retainer front surface.

In an eighteenth embodiment, a pump comprises the pump fluid end of any one of the tenth to seventeenth embodiments and a pump power end, wherein the pump power end is operable to reciprocate the reciprocating element within the reciprocating element bore of the pump fluid end.

In a nineteenth embodiment, a method of servicing a wellbore comprises: fluidly coupling a pump to a source of a wellbore servicing fluid and to the wellbore; and communicating wellbore servicing fluid into a formation in fluid communication with the wellbore via the pump, wherein the pump comprises a pump fluid end and a pump power end, wherein the pump fluid end comprises: a reciprocating element at least partially within a reciprocating element bore of the pump fluid end, wherein the reciprocating element bore extends from a terminus thereof into the pump fluid end from an end of the pump fluid end and has a central axis; a suction valve; a discharge valve; and a packing system comprising: a packing stack comprising a packing, wherein the packing is cylindrical and compressible and positioned within and substantially filling a void volume in the reciprocating element bore of the pump; one or more springs; and a terminal component sealing a terminus of the reciprocating element bore, wherein the one or more springs are positioned between the terminal component and the packing to provide a sufficient force on the packing to maintain compression of the packing within the void volume; and wherein the pump power end is operable to reciprocate the reciprocating element within the reciprocating element bore of the pump fluid end.

A twentieth embodiment can include the method of the nineteenth embodiment, wherein the one or more springs comprise a helical spring, a frusto-conical spring, or a combination thereof.

A twenty first embodiment can include the method of the twentieth embodiment, wherein the one or more springs comprise a Belleville spring.

A twenty second embodiment can include the method of the twenty first embodiment comprising a plurality of Bellville springs, wherein the plurality of Belleville springs are arranged in series, in parallel, or a combination thereof (i.e., in series-parallel).

A twenty third embodiment can include the method of any one of the nineteenth to twenty second embodiments further comprising selecting a number, a plate thickness, an initial deformation, and/or an arrangement of the one or more springs such that the one or more springs can expand an axial distance in a direction parallel to the central axis while maintaining the sufficient force, wherein the axial distance is at least 0.05, 0.06, 0.07, 0.08, 0.09, or 0.1 inch (1.3, 1.5, 1.8, 2.0, 2.3, or 2.5 mm).

A twenty fourth embodiment can include the method of any one of the nineteenth to twenty third embodiments, wherein the force exerted on the packing by the one or more springs increases as the one or more springs expand in an axial direction parallel to the central axis of the reciprocating element bore.

A twenty fifth embodiment can include the method of any one of the nineteenth to twenty fourth embodiments, wherein the wellbore servicing fluid comprises a fracturing fluid, a cementitious fluid, a remedial fluid, a perforating fluid, a sealant, a drilling fluid, a spacer fluid, a completion fluid, a gravel pack fluid, a diverter fluid, a gelation fluid, a polymeric fluid, an aqueous fluid, an oleaginous fluid, or a combination thereof.

A twenty sixth embodiment can include the method of any one of the nineteenth to twenty fifth embodiments, wherein the pump operates during the pumping of the wellbore servicing fluid at a pressure of greater than or equal to about 3,000 psi, 5,000 psi, 10,000 psi, 20,000 psi, 30,000 psi, 40,000 psi, or 50,000 psi.

A twenty seventh embodiment can include the method of any one of the nineteenth to twenty sixth embodiments, wherein the pump operates during the pumping of the wellbore servicing fluid at a volumetric flow rate of greater than or equal to about 3, 10, or 20 barrels per minute (BPM), or in a range of from about 3 to about 20, from about 10 to about 20, or from about 5 to about 20 BPM.

While embodiments have been shown and described, modifications thereof can be made by one skilled in the art without departing from the spirit and teachings of this disclosure. The embodiments described herein are exemplary only, and are not intended to be limiting. Many variations and modifications of the embodiments disclosed herein are possible and are within the scope of this disclosure. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, Rl, and an upper limit, Ru, is disclosed, any number falling within the range is specifically disclosed. In particular, the following numbers within the range are specifically disclosed: R=Rl+k*(Ru−Rl), wherein k is a variable ranging from 1 percent to 100 percent with a 1 percent increment, i.e., k is 1 percent, 2 percent, 3 percent, 4 percent, 5 percent, . . . 50 percent, 51 percent, 52 percent, . . . , 95 percent, 96 percent, 97 percent, 98 percent, 99 percent, or 100 percent. Moreover, any numerical range defined by two R numbers as defined in the above is also specifically disclosed. Use of the term "optionally" with respect to any element of a claim is intended to mean that the subject element is required, or alternatively, is not required. Both alternatives are intended to be within the scope of the claim. Use of broader terms such as comprises, includes, having, etc. should be understood to provide support for narrower terms such as consisting of, consisting essentially of, comprised substantially of, etc.

Accordingly, the scope of protection is not limited by the description set out above but is only limited by the claims which follow, that scope including all equivalents of the subject matter of the claims. Each and every claim is incorporated into the specification as an embodiment of the present disclosure. Thus, the claims are a further description and are an addition to the embodiments of the present disclosure. The discussion of a reference herein is not an admission that it is prior art, especially any reference that may have a publication date after the priority date of this application. The disclosures of all patents, patent applications, and publications cited herein are hereby incorporated by reference, to the extent that they provide exemplary, procedural, or other details supplementary to those set forth herein.

We claim:

1. A pump fluid end comprising:
a reciprocating element at least partially within a reciprocating element bore of the pump fluid end, wherein the reciprocating element bore extends from a terminus thereof into the pump fluid end from an end of the pump fluid end and has a central axis;
a suction valve;
a discharge valve; and
a packing system, wherein the packing system comprises:
a packing stack comprising a reciprocating element packing, wherein the reciprocating element packing is cylindrical and compressible such that the reciprocating element packing can fill a void volume in the reciprocating element bore of the pump;
one or more springs; and
a terminal component configured for sealing the terminus of the reciprocating element bore,
wherein the one or more springs are positioned between the terminal component and the reciprocating element packing to provide a force on the reciprocating element packing that maintains compression of the reciprocating element packing within the void volume, and
wherein the one or more springs comprise a helical spring, a frusto-conical spring, or a combination thereof.

2. The pump fluid end of claim 1, wherein the one or more springs comprise a Belleville spring.

3. The pump fluid end of claim 2 comprising a plurality of Bellville springs, wherein the plurality of Belleville springs are arranged in series, in parallel, or a combination thereof.

4. The pump fluid end of claim 3, wherein the force exerted on the reciprocating element packing by the one or more springs increases as the one or more springs expand, from an initial deformation an axial distance of at least 0.05 inch (1.3 mm) in a direction parallel to the central axis.

5. The pump fluid end of claim 1, wherein the one or more springs can expand, from an initial deformation, an axial distance of at least 0.05 inch (1.3 mm) in a direction parallel to a central axis of the reciprocating element bore while maintaining the force.

6. The pump fluid end of claim 1, wherein the force exerted on the reciprocating element packing by the one or more springs increases as the one or more springs expand, from an initial deformation, an axial distance of at least 0.05 inch (1.3 mm) in a direction parallel to a central axis of the reciprocating element bore.

7. A method of servicing a wellbore, the method comprising:
fluidly coupling a pump to a source of a wellbore servicing fluid and to the wellbore; and
communicating wellbore servicing fluid into a formation in fluid communication with the wellbore via the pump, wherein the pump comprises the pump fluid end of claim 1 and a pump power end.

8. The method of claim 7, wherein the one or more springs comprise a Belleville spring.

9. The method of claim 8 comprising a plurality of Bellville springs, wherein the plurality of Belleville springs are arranged in series, in parallel, or a combination thereof.

10. The method of claim 7, further comprising selecting a number, a plate thickness, an initial deformation, and/or an arrangement of the one or more springs such that the one or more springs can expand, from the initial deformation, an axial distance of at least 0.05 inch (1.3 mm) in a direction parallel to the central axis while maintaining the force.

11. The method of claim 7, wherein the force exerted on the reciprocating element packing by the one or more springs increases as the one or more springs expand, from an initial deformation, an axial distance of at least 0.05 inch (1.3 mm) in a direction parallel to a central axis of the reciprocating element bore.

12. The method of claim 7, wherein the wellbore servicing fluid comprises a fracturing fluid, a cementitious fluid, a remedial fluid, a perforating fluid, a sealant, a drilling fluid, a spacer fluid, a completion fluid, a gravel pack fluid, a diverter fluid, a gelation fluid, a polymeric fluid, an aqueous fluid, an oleaginous fluid, or a combination thereof.

13. The method of claim 7, wherein the pump operates during the pumping of the wellbore servicing fluid at a pressure of greater than or equal to about 3,000 psi.

14. The method of claim 7 wherein the pump operates during the pumping of the wellbore servicing fluid at a volumetric flow rate of greater than or equal to about 3 BPM.

15. The pump fluid end of claim 1, wherein the packing stack further comprises: a packing carrier, wherein the packing carrier is cylindrical and has an inside surface, an outside surface, a front surface, and a back surface; an o-ring in a groove in the packing carrier outside surface; a packing lube seal in contact with the inside surface of the packing carrier and in fluid communication with a hole extending from the packing carrier outside surface to the packing carrier inside surface; a backup ring, wherein the backup ring is cylindrical, wherein the backup ring has a backup ring front surface and a backup ring back surface, wherein, in an assembled configuration of the packing stack, the backup ring back surface is adjacent the packing carrier front surface, and the backup ring front surface is adjacent a packing back surface of the packing; a header ring, wherein the header ring is cylindrical, wherein the header ring has a header ring front surface and a header ring back surface, and wherein the header ring back surface is adjacent a packing front end of the packing; and/or a header ring adapter, wherein the header ring adapter has a header ring adapter front surface and a header ring adapter back surface, and where, in the assembled configuration, the header ring adapter back surface is adjacent the header ring front surface.

* * * * *